(12) United States Patent
Branagan et al.

(10) Patent No.: US 8,356,590 B2
(45) Date of Patent: Jan. 22, 2013

(54) METHOD AND PRODUCT FOR CUTTING MATERIALS

(75) Inventors: Daniel James Branagan, Idaho Falls, ID (US); David Paratore, Warren, RI (US)

(73) Assignee: Tha NanoSteel Company, Inc., Providence, RI (US)

( * ) Notice: Subject to any disclaimer, the term of this patent is extended or adjusted under 35 U.S.C. 154(b) by 481 days.

(21) Appl. No.: 12/699,590

(22) Filed: Feb. 3, 2010

(65) Prior Publication Data

US 2010/0197202 A1 Aug. 5, 2010

Related U.S. Application Data

(60) Provisional application No. 61/149,619, filed on Feb. 3, 2009.

(51) Int. Cl.
*B28D 1/06* (2006.01)
(52) U.S. Cl. ...................... 125/16.02; 125/21
(58) Field of Classification Search .............. 125/16.01, 125/16.02, 21; 451/36, 56; 420/14, 36, 581; 164/47, 114, 76.1
See application file for complete search history.

(56) References Cited

U.S. PATENT DOCUMENTS

| | | |
|---|---|---|
| 1,793,529 A | 2/1931 | Taylor |
| 4,318,738 A | 3/1982 | Masumoto et al. |
| 7,306,508 B2 | 12/2007 | Kawasaki et al. |
| 2001/0007266 A1 | 7/2001 | Sunakawa et al. |
| 2003/0089899 A1 | 5/2003 | Lieber et al. |
| 2007/0194492 A1 | 8/2007 | Floratti |
| 2007/0209776 A1 | 9/2007 | Adenot-Engelvin et al. |

FOREIGN PATENT DOCUMENTS

EP 0330752 9/1989

OTHER PUBLICATIONS

International Search Report and Written Opinion dated Mar. 31, 2010 issued in related International Patent Application No. PCT/US10/23054.
Krakauer, et al., "Scale study of segregation at grain boundaries in an Fe(Si) alloy" 1998, 1-23 Acta mater, vol. 46, No. 17, pp. 6145-6161.
Agostinelli, et al., "Thin Solar Cells: issues and Processing for High Efficiency," 17th Workshop on Crystalline Silicon Solar Cells and Modules: Materials and Processes Proceedings, Aug. 2007 pp. 79-86.

(Continued)

*Primary Examiner* — Dung Van Nguyen
(74) *Attorney, Agent, or Firm* — Grossman, Tucker, Perreault & Pfleger, PLLC

(57) ABSTRACT

The present disclosure relates to a wire and a method of forming a wire including an iron based glass forming alloy including iron present in the range of 43.0 to 68.0 atomic percent, boron present in the range of 12.0 to 19.0 atomic percent, nickel present in the range of 15.0 to 17.0 atomic percent, cobalt present in the range of 2.0 to 21.0 atomic percent, optionally carbon present in the range of 0.1 to 6.0 atomic percent and optionally silicon present in the range of 0.4 to 4.0 atomic percent, wherein said wire has a thickness of 140 μm or less and wherein said wire includes spinodal glass matrix microconstituents. The wire may be used in abrading a substrate.

18 Claims, 13 Drawing Sheets

OTHER PUBLICATIONS

Barraclough, et al., "Waste Not, Want Not!—A Case for Recycling Silicon Waster Powder," KGB Consulting Ltd, 2006 pp. 1-6.

Winegarner, "Current and Future Status of Global Polysilicon Production," 17th Workshop on Crystalline Silicon Solar Cells and Modules: Materials and Processes Proceedings, Aug. 2007 pp. 53-56.

Taylor, "A Method of Drawing Metallic Filaments and a Discussion of their Properties and Uses," Fine Metallic Filaments, Phys. Rev., 23 (1924) pp. 655-660.

Pauli et al., "Swiss Wafer Slicing Technology for the Global PV Market from Meyer + Burger AG—Novel Trends for the Future in Photovoltaic Wafer Manufacturing," 6° Symposium Photovoltaique National SIG Geneve, Nov. 24-25, 2005 (10 pages).

METHOD AND PRODUCT FOR CUTTING MATERIALS

CROSS REFERENCE TO RELATED APPLICATIONS

The present application claims the benefit of the filing date of U.S. Provisional Application No. 61/149,619, filed on Feb. 3, 2009, the disclosure of which is incorporated herein by reference.

FIELD

The present disclosure relates to a method for cutting materials, wherein the method includes using wires formed from relatively ductile iron based glass forming material.

BACKGROUND

Existing wires utilized for wire saws may typically be made of relatively high tensile steel which may be deep drawn down to achieve relatively fine wire diameters in the range of 140 to 380 μm. The lower limit in wire diameter may be limited by the number and practicality of stages of conventional wire drawing, and the ability to achieve significant levels of ductility which are reduced from work hardening. Wire cutting saws may include two different varieties, such as slurry abrasive or diamond wire saws. In slurry abrasive wire cutting, a bare steel wire or brass coated steel wire may be utilized in combination with a slurry abrasive which may include a relatively large variety of abrasives such as SiC. The relatively fast moving wire may contact the abrasive in the liquid slurry, which may become trapped between the wire and the substrate resulting in the cutting of the substrate. In diamond wire cutting, a steel wire may be used as the wire base, which is then coated with an electrolytic copper sheet impregnated with diamonds, and 10 to 120 μm in size. The entire wire may then be coated with a nickel overstrike to reinforce the wire. As may be appreciated the steel base wire is one factor limiting the total wire diameter and the impregnated copper and nickel coatings add to the diameter. There may be several advantages and disadvantages between the slurry abrasive wire and diamond wire cutting techniques. For wafer cutting, a diamond coated wire can offer advantages such as the precision of the cut compared to slurry abrasion cutting which may wander. Alternately, slurry abrasive cutting offers an advantage with respect to lower edge chipping compared to diamond wire cutting and, accordingly, slurry abrasive wire cutting appears to be used prevalently in cutting large diameter silicon ingots.

For any high value material including silicon, germanium, gallium arsenide, quartz, glass, etc., the material losses or kerf losses during cutting may be significant. One overriding factor in total kerf loss during cutting may be the wire diameter utilized, wherein smaller wire diameters may lead to lower kerf losses. The following case example regarding silicon wafer illustrates the value of these losses for silicon in the microelectronics and photovoltaic industries.

That is, one key cost factor for silicon wafer processing may include the material lost during cutting or kerf losses. As the price of raw materials has increased and the thickness of the wafer has decreased, the kerf loss has been an increasingly important factor. With current wire technology it has been estimated that the kerf thickness loss may ultimately be brought down to 150 μm in thickness. Furthermore, this loss becomes increasingly important as wafer size decreases. For example, for industrial solar cells, in 2004 the average thickness was 330 μm but by 2007, the average wafer thickness was 210 μm. Additionally, the recycling of silicon kerf is challenging since it is exists in a slurry with polyethylene glycol liquid containing impurities including iron from the wire and SiC abrasives.

In 2006, the world wide production capacity of polysilicon was at 37,500 tons. It has been estimated that 70% of all polysilicon feedstock ends up as usable silicon ingot resulting in 26,250 tons produced. The average kerf loss in wafer sawing process is estimated to be 35% which results in a total silicon waste at 9,188 tons. In 2006, the average price per pound of silicon varied widely depending on the type with the following values published; Solar Poly Price at $36.3/lb, Semiconductor CZ Price at $27.21/lb, Semiconductor FZ Price at $90.70/lb and Spot Market Price depending on availability at $136.05/lb. A conservative estimate based on prices above is a cost basis of $55/lb for value of microelectronic grade silicon. Thus, the yearly monetary value of kerf waste can be estimated at $1.01 Billion dollars per year. Furthermore, manufacturing of microelectronic grade silicon is relatively energy intensive and involves high temperatures at extended times in order to extract, purify, and grow crystals from the melt. It has been estimated that electron energy usage is 90.7 MW hours per ton of silicon ingot. The average kerf loss in the wafer sawing process as stated earlier is 9,188 tons. Thus, the total energy lost for wasted silicon is 833,352 MW hours. Considering a rough estimate of the average cost of electricity at $10.00 per MW hour, then the total wasted electricity cost is $0.83 billion dollars per year.

SUMMARY

An aspect of the present disclosure relates to a wire, which may include an iron based glass forming alloy. The alloy may include iron present in the range of 43.0 to 68.0 atomic percent, boron present in the range of 12.0 to 19.0 atomic percent, nickel present in the range of 15.0 to 17.0 atomic percent, cobalt present in the range of 2.0 to 21.0 atomic percent, optionally carbon present in the range of 0.1 to 6.0 atomic percent and optionally silicon present in the range of 0.4 to 4.0 atomic percent. The wire may have a thickness of 140 μm or less and include spinodal glass matrix microconstituents.

Another aspect of the present disclosure relates to a method of cutting substrates. The method may include abrading a substrate with a wire including an iron based glass forming alloy. The alloy may include iron present in the range of 43.0 to 68.0 atomic percent, boron present in the range of 12.0 to 19.0 atomic percent, nickel present in the range of 15.0 to 17.0 atomic percent, cobalt present in the range of 2.0 to 21.0 atomic percent, optionally carbon present in the range of 0.1 to 6.0 atomic percent and optionally silicon present in the range of 0.4 to 4.0 atomic percent. The wire may have a thickness of 140 μm or less and include spinodal glass matrix microconstituents.

A further aspect of the present disclosure relates to a method of forming a wire. The method may include melting elemental constituents to provide an iron based glass forming alloy and forming the iron based glass forming alloy into a wire exhibiting a thickness of 140 μm or less wherein the wire includes spinodal glass matrix microconstituents. The alloy may include iron present in the range of 43.0 to 68.0 atomic percent, boron present in the range of 12.0 to 19.0 atomic percent, nickel present in the range of 15.0 to 17.0 atomic percent, cobalt present in the range of 2.0 to 21.0 atomic percent, optionally carbon present in the range of 0.1 to 6.0 atomic percent and optionally silicon present in the range of 0.4 to 4.0 atomic percent

BRIEF DESCRIPTION OF THE DRAWINGS

The above-mentioned and other features of this disclosure, and the manner of attaining them, may become more apparent and better understood by reference to the following description of embodiments described herein taken in conjunction with the accompanying drawings, wherein.

DETAILED DESCRIPTION

Figure 1:
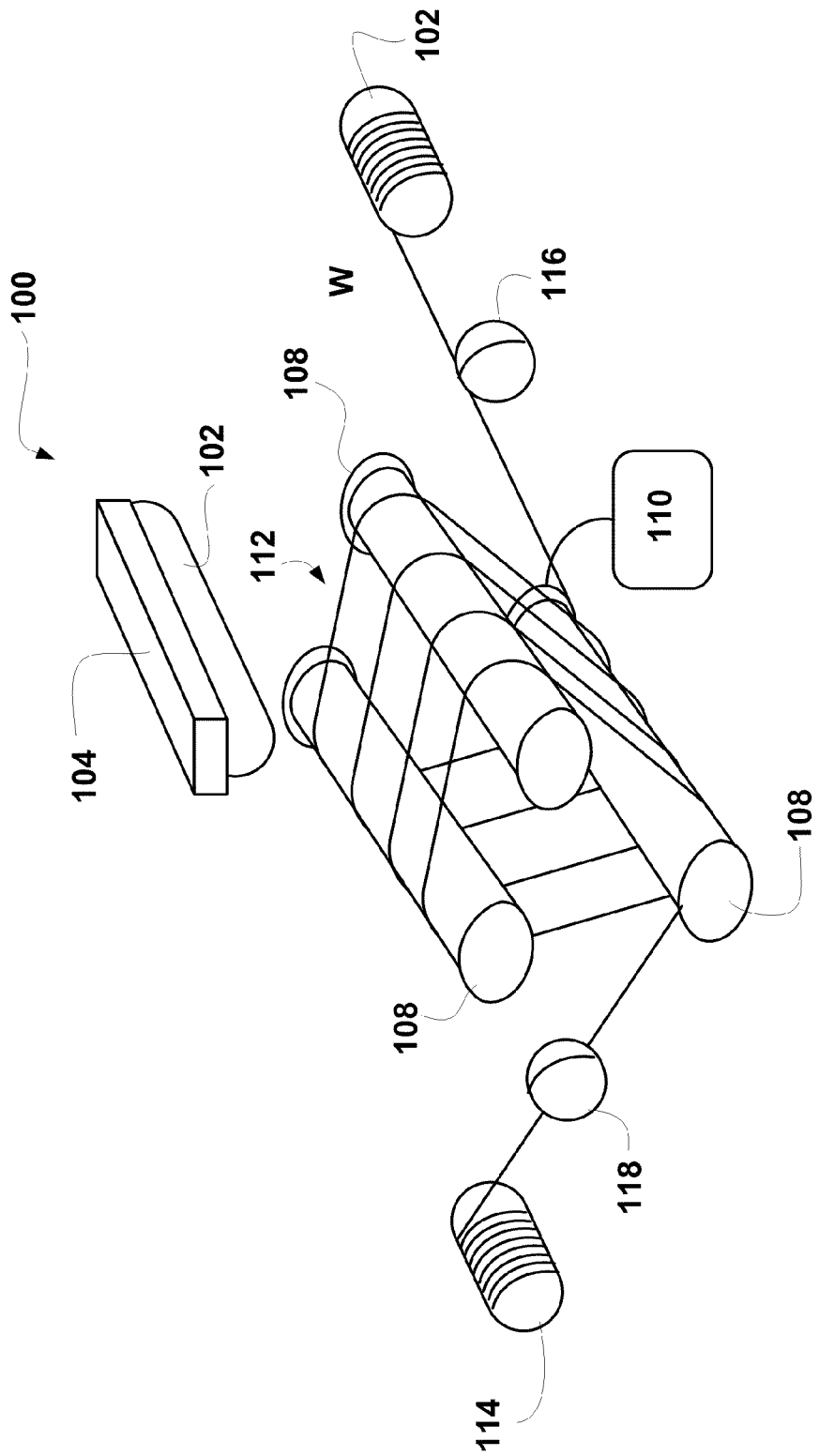
FIG. 1 illustrates an example schematic of a wire saw.

The present disclosure relates to a composition, method and process for using wires formed of an iron based glass forming alloy. Such wires may be relatively finer in size, which may result in relatively lower kerf cutting waste. The glass based forming alloy may be understood as an iron alloy wherein the alloy may be relatively amorphous, or may exhibit micro- or nano-structures, which may be understood as associations of structural units in the solid phase that may be randomly packed together. In some examples, the micro- or nano-structures may be present in ranges of 1 to 100% by volume in the alloy composition, including all values and increments therein. In other examples, the glass may be presented in ranges of 1 to 90% by volume of the alloy composition, including all values and increments therein. Relatively amorphous alloys or alloy fractions may exhibit little to no ordering on the atomic level. The micro- or nano-structures may be in the range of 0.1 nm to 1.0 micron in size, including all values and increments therein.

Furthermore, the alloys may form Spinodal Glass Matrix Microconstituent (SGMM) structures that may exhibit relatively significant ductility and relatively high tensile strength. Spinodal microconstituents may be understood as microconstituents formed by a transformation mechanism which is not nucleation controlled. More basically, spinodal decomposition may be understood as a mechanism by which a solution of two or more components (e.g. metal compositions) of the alloy can separate into distinct regions (or phases) with distinctly different chemical compositions and physical properties. This mechanism differs from classical nucleation in that phase separation occurs uniformly throughout the material and not just at discrete nucleation sites. One or more semicrystalline clusters or crystalline phases may therefore form through a successive diffusion of atoms on a local level until the chemistry fluctuations lead to at least one distinct crystalline phase. Semi-crystalline clusters may be understood herein as exhibiting a largest linear dimension of 2 nm or less, whereas crystalline clusters may exhibit a largest linear dimension of greater than 2 nm. Note that during the early stages of the spinodal decomposition, the clusters which are formed may be relatively small and while their chemistry differs from the glass matrix, they are not yet fully crystalline and have not yet achieved well ordered crystalline periodicity. Additional crystalline phases may exhibit the same crystal structure or distinct structures. Furthermore the glass matrix may be understood to include microstructures that may exhibit associations of structural units in the solid phase that may be randomly packed together. The level of refinement, or the size, of the structural units may be in the angstrom scale range (i.e. 5 Å to 100 Å).

Accordingly, the present disclosure relates to a cutting methodology to cut relatively high value materials including but not limited to silicon, germanium, gallium arsenide, quartz, glass, etc., into ingots, crystals, wafers, thin slices, etc., which may result in relatively lower cutting loss, thus improving material utilization and reducing manufacturing costs. In this approach, relatively thin microwires from 1 µm to 140 µm in thickness (i.e., diameter) may be manufactured in a process that may form wires directly from a liquid melt. It is contemplated that wire production may be accomplished by utilizing a casting process or the Taylor-Ulitovsky wire making process in combination with relatively ductile iron based glass forming alloy chemistries to thereby produce wires that may exhibit combinations of relatively high tensile strength of greater than or equal to 1 GPa and tensile elongation of greater than or equal to 1.5%.

The wires produced are contemplated to have a length of up to 1000 kilometers. More specifically, the wires may have lengths in the range of 500 meters or greater, including all values and increments therein. For example, the wires may have length between 1 kilometer to 500 kilometers, including all values and increments therein, in 0.5 kilometer variations. The wires may then be utilized in single or multi-wire sawing, where a workpiece to be sliced may be pushed into the wire web, which may be wound from one side to the other. For example, silicon pillars having a length of up to and including 1 meter, after treatment with the multi-wire sawing device, may be sliced into thousands of wafers in a single run. However, the present invention contemplates the use of the wires on their own, for slicing, and is not limited to use in such multi-wire sawing configurations.

The alloy may include, consist essentially of or consist of in the range of 43.0 at. % (atomic percent) to 68.0 at. % iron, 12.0 at. % to 19.0 at. % boron, 15.0 at. % to 17.0 at. % nickel and 2.0 at. % to 21.0 at. % cobalt, including all increments and values within the given ranges. The alloy may also, optionally, include carbon present in the range of 0.1 at. % to 6.0 at. % and silicon present in the range of 0.4 to 4.0 atomic percent, including all increments and values within the given ranges. Accordingly, it may be appreciated that iron may be present at values of 43.0 at. %, 43.1 at. %, 43.2 at. %, 43.3 at. %, 43.4 at. %, 43.5 at. %, 43.6 at. %, 43.7 at. %, 43.8 at. %, 43.9 at. %, 44.0 at. %, 44.1 at. %, 44.2 at. %, 44.3 at. %, 44.4 at. %, 44.5 at. %, 44.6 at. %, 44.7 at. %, 44.8 at. %, 44.9 at. %, 45.0 at. %, 45.1 at. %, 45.2 at. %, 45.3 at. %, 45.4 at. %, 45.5 at. %, 45.6 at. %, 45.7 at. %, 45.8 at. %, 45.9 at. %, 46.0 at. %, 46.1 at. %, 46.2 at. %, 46.3 at. %, 46.4 at. %, 46.5 at. %, 46.6 at. %, 46.7 at. %, 46.8 at. %, 46.9 at. %, 47.0 at. %, 47.1 at. %, 47.2 at. %, 47.3 at. %, 47.4 at. %, 47.5 at. %, 47.6 at. %, 47.7 at. %, 47.8 at. %, 47.9 at. %, 48.0 at. %, 48.1 at. %, 48.2 at. %, 48.3 at. %, 48.4 at. %, 48.5 at. %, 48.6 at. %, 48.7 at. %, 48.8 at. %, 48.9 at. %, 49.0 at. %, 49.1 at. %, 49.2 at. %, 49.3 at. %, 49.4 at. %, 49.5 at. %, 49.6 at. %, 49.7 at. %, 49.8 at. %, 49.9 at. %, 50.0 at. %, 50.1 at. %, 50.2 at. %, 50.3 at. %, 50.4 at. %, 50.5 at. %, 50.6 at. %, 50.7 at. %, 50.8 at. %, 50.9 at. %, 51.0 at. %, 51.1 at. %, 51.2 at. %, 51.3 at. %, 51.4 at. %, 51.5 at. %, 51.6 at. %, 51.7 at. %, 51.8 at. %, 51.9 at. %, 52.0 at. %, 52.1 at. %, 52.2 at. %, 52.3 at. %, 52.4 at. %, 52.5 at. %, 52.6 at. %, 52.7 at. %, 52.8 at. %, 52.9 at. %, 53.0 at. %, 53.1 at. %, 53.2 at. %, 53.3 at. %, 53.4 at. %, 53.5 at. %, 53.6 at. %, 53.7 at. %, 53.8 at. %, 53.9 at. %, 54.0 at. %, 54.1 at. %, 54.2 at. %, 54.3 at. %, 54.4 at. %, 54.5 at. %, 54.6 at. %, 54.7 at. %, 54.8 at. %, 54.9 at. %, 55.0 at. %, 55.1 at. %, 55.2 at. %, 55.3 at. %, 55.4 at. %, 55.5 at. %, 55.6 at. %, 55.7 at. %, 55.8 at. %, 55.9 at. %, 56.0 at. %, 56.1 at. %, 56.2 at. %, 56.3 at. %, 56.4 at. %, 56.5 at. %, 56.6 at. %, 56.7 at. %, 56.8 at. %, 56.9 at. %, 57.0 at. %, 57.1 at. %, 57.2 at. %, 57.3 at. %, 57.4 at. %, 57.5 at. %, 57.6 at. %, 57.7 at. %, 57.8 at. %, 57.9 at. %, 58.0 at. %, 58.1 at. %, 58.2 at. %, 58.3 at. %, 58.4 at. %, 58.5 at. %, 58.6 at. %, 58.7 at. %, 58.8 at. %, 58.9 at. %, 59.0 at. %, 59.1 at. %, 59.2 at. %, 59.3 at. %, 59.4 at. %, 59.5 at. %, 59.6 at. %, 59.7 at. %, 59.8 at. %, 59.9 at. %, 60.0 at. %, 60.1 at. %, 60.2 at. %, 60.3 at. %, 60.4 at. %, 60.5 at. %, 60.6 at. %, 60.7 at. %, 60.8 at. %, 60.9 at. %, 61.0 at. %, 61.1 at. %, 61.2 at. %, 61.3 at. %, 61.4 at. %, 61.5 at. %, 61.6 at. %, 61.7 at. %, 61.8 at. %, 61.9 at. %, 62.0 at. %, 62.1 at. %, 62.2 at. %, 62.3 at. %, 62.4 at. %, 62.5 at. %, 62.6 at. %, 62.7 at. %, 62.8 at. %, 62.9 at. %, 63.0 at. %, 63.1 at. %, 63.2 at. %, 63.3 at. %, 63.4 at. %, 63.5 at. %, 63.6 at. %, 63.7 at. %, 63.8 at. %, 63.9 at. %, 64.0 at. %, 64.1 at. %, 64.2 at. %, 64.3 at. %, 64.4 at. %, 64.5 at. %, 64.6 at. %, 64.7 at. %, 64.8 at. %, 64.9 at. %, 65.0 at. %, 65.1 at. %, 65.2 at. %, 65.3 at. %, 65.4 at. %, 65.5 at. %, 65.6 at. %, 65.7 at. %, 65.8 at. %, 65.9 at. %, 66.0 at. %, 66.1 at. %, 66.2 at. %, 66.3 at. %, 66.4 at. %, 66.5 at. %, 66.6 at. %, 66.7 at. %, 66.8 at. %, 66.9 at. %, 67.0 at. %, 67.1 at. %, 67.2 at. %, 67.3 at. %, 67.4 at. %, 67.5 at. %, 67.6 at. %, 67.7 at. %, 67.8 at. %, 67.9 at. %, 68.0 at. %. Boron may be present at 12.0 at. %, 12.1 at. %, 12.2 at. %, 12.3 at. %, 12.4 at. %, 12.5 at. %, 12.6 at. %, 12.7 at. %, 12.8 at. %, 12.9 at. %, 13.0 at. %, 13.1 at. %, 13.2 at. %, 13.3 at. %, 13.4 at. %, 13.5 at. %, 13.6 at. %, 13.7 at. %, 13.8 at. %, 13.9 at. %, 14.0 at. %, 14.1 at. %, 14.2 at. %, 14.3 at. %, 14.4 at. %, 14.5 at. %, 14.6 at. %, 14.7 at. %, 14.8 at. %, 14.9 at. %, 15.0 at. %, 15.1 at. %, 15.2 at. %, 15.3 at. %, 15.4 at. %, 15.5 at. %, 15.6 at. %, 15.7 at. %, 15.8 at. %, 15.9 at. %, 16.0 at. %, 16.1 at. %, 16.2 at. %, 16.3 at. %, 16.4 at. %, 16.5 at. %, 16.6 at. %, 16.7 at. %, 16.8 at. %, 16.9 at. %, 17.0 at. %, 17.1 at. %, 17.2 at. %, 17.3 at. %, 17.4 at. %, 17.5 at. %, 17.6 at. %, 17.7 at. %, 17.8 at. %, 17.9 at. %, 18.0 at. %, 18.1 at. %, 18.2 at. %, 18.3 at. %, 18.4 at. %, 18.5 at. %, 18.6 at. %, 18.7 at. %, 18.8 at. %, 18.9 at. %, 19.0 at. %. Nickel may be present at 15.0 at. %, 15.1 at. %, 15.2 at. %, 15.3 at. %, 15.4 at. %, 15.5 at. %, 15.6 at. %, 15.7 at. %, 15.8 at. %, 15.9 at. %, 16.0 at. %, 16.1 at. %, 16.2 at. %, 16.3 at. %, 16.4 at. %, 16.5 at. %, 16.6 at. %, 16.7 at. %, 16.8 at. %, 16.9 at. %, 17.0 at. %. Cobalt may be present at 2.0 at. %, 2.1 at. %, 2.2 at. %, 2.3 at. %, 2.4 at. %, 2.5 at. %, 2.6 at. %, 2.7 at. %, 2.8 at. %, 2.9 at. %, 3.0 at. %, 3.1 at. %, 3.2 at. %, 3.3 at. %, 3.4 at. %, 3.5 at. %, 3.6 at. %, 3.7 at. %, 3.8 at. %, 3.9 at. %, 4.0 at. %, 4.1 at. %, 4.2 at. %, 4.3 at. %, 4.4 at. %, 4.5 at. %, 4.6 at. %, 4.7 at. %, 4.8 at. %, 4.9 at. %, 5.0 at. %, 5.1 at. %, 5.2 at. %, 5.3 at. %, 5.4 at. %, 5.5 at. %, 5.6 at. %, 5.7 at. %, 5.8 at. %, 5.9 at. %, 6.0 at. %, 6.1 at. %, 6.2 at. %, 6.3 at. %, 6.4 at. %, 6.5 at. %, 6.6 at. %, 6.7 at. %, 6.8 at. %, 6.9 at. %, 7.0 at. %, 7.1 at. %, 7.2 at. %, 7.3 at. %, 7.4 at. %, 7.5 at. %, 7.6 at. %, 7.7 at. %, 7.8 at. %, 7.9 at. %, 8.0 at. %, 8.1 at. %, 8.2 at. %, 8.3 at. %, 8.4 at. %, 8.5 at. %, 8.6 at. %, 8.7 at. %, 8.8 at. %, 8.9 at. %, 9.0 at. %, 9.1 at. %, 9.2 at. %, 9.3 at. %, 9.4 at. %, 9.5 at. %, 9.6 at. %, 9.7 at. %, 9.8 at. %, 9.9 at. %, 10.0 at. %, 10.1 at. %, 10.2 at. %, 10.3 at. %, 10.4 at. %, 10.5 at. %, 10.6 at. %, 10.7 at. %, 10.8 at. %, 10.9 at. %, 11.0 at. %, 11.1 at. %, 11.2 at. %, 11.3 at. %, 11.4 at. %, 11.5 at. %, 11.6 at. %, 11.7 at. %, 11.8 at. %, 11.9 at. %, 12.0 at. %, 12.1 at. %, 12.2 at. %, 12.3 at. %, 12.4 at. %, 12.5 at. %, 12.6 at. %, 12.7 at. %, 12.8 at. %, 12.9 at. %, 13.0 at. %, 13.1 at. %, 13.2 at. %, 13.3 at. %, 13.4 at. %, 13.5 at. %, 13.6 at. %, 13.7 at. %, 13.8 at. %, 13.9 at. %, 14.0 at. %, 14.1 at. %, 14.2 at. %, 14.3 at. %, 14.4 at. %, 14.5 at. %, 14.6 at. %, 14.7 at. %, 14.8 at. %, 14.9 at. %, 15.0 at. %, 15.1 at. %, 15.2 at. %, 15.3 at. %, 15.4 at. %, 15.5 at. %, 15.6 at. %, 15.7 at. %, 15.8 at. %, 15.9 at. %, 16.0 at. %, 16.1 at. %, 16.2 at. %, 16.3 at. %, 16.4 at. %, 16.5 at. %, 16.6 at. %, 16.7 at. %, 16.8 at. %, 16.9 at. %, 17.0 at. %, 17.1 at. %, 17.2 at. %, 17.3 at. %, 17.4 at. %, 17.5 at. %, 17.6 at. %, 17.7 at. %, 17.8 at. %, 17.9 at. %, 18.0 at. %, 18.1 at. %, 18.2 at. %, 18.3 at. %, 18.4 at. %, 18.5 at. %, 18.6 at. %, 18.7 at. %, 18.8 at. %, 18.9 at. %, 19.0 at. %, 19.1 at. %, 19.2 at. %, 19.3 at. %, 19.4 at. %, 19.5 at. %, 19.6 at. %, 19.7 at. %, 19.8 at. %, 19.9 at. %, 20.0 at. %, 20.1 at. %, 20.2 at. %, 20.3 at. %, 20.4 at. %, 20.5 at. %, 20.6 at. %, 20.7 at. %, 20.8 at. %, 20.9 at. %, 21.0 at. %. Carbon may be present at 0.0 at. %, 0.1 at. %, 0.2 at. %, 0.3 at. %, 0.4 at. %, 0.5 at. %, 0.6 at. %, 0.7 at. %, 0.8 at. %, 0.9 at. %, 1.0 at. %, 1.1 at. %, 1.2 at. %, 1.3 at. %, 1.4 at. %, 1.5 at. %, 1.6 at. %, 1.7 at. %, 1.8 at. %, 1.9 at. %, 2.0 at. %, 2.1 at. %, 2.2 at. %, 2.3 at. %, 2.4 at. %, 2.5 at. %, 2.6 at. %, 2.7 at. %, 2.8 at. %, 2.9 at. %, 3.0 at. %, 3.1 at. %, 3.2 at. %, 3.3 at. %, 3.4 at. %, 3.5 at. %, 3.6 at. %, 3.7 at. %, 3.8 at. %, 3.9 at. %, 4.0 at. %, 4.1 at. %, 4.2 at. %, 4.3 at. %, 4.4 at. %, 4.5 at. %, 4.6 at. %, 4.7 at. %, 4.8 at. %, 4.9 at. %, 5.0 at. %, 5.1 at. %, 5.2 at. %, 5.3 at. %, 5.4 at. %, 5.5 at. %, 5.6 at. %, 5.7 at. %, 5.8 at. %, 5.9 at. %, 6.0 at. %. Silicon may be present at 0.0 at. %, 0.4 at. %, 0.5 at. %, 0.6 at. %, 0.7 at. %, 0.8 at. %, 0.9 at. %, 1.0 at. %, 1.1 at. %, 1.2 at. %, 1.3 at. %, 1.4 at. %, 1.5 at. %, 1.6 at. %, 1.7 at. %, 1.8 at. %, 1.9 at. %, 2.0 at. %, 2.1 at. %, 2.2 at. %, 2.3 at. %, 2.4 at. %, 2.5 at. %, 2.6 at. %, 2.7 at. %, 2.8 at. %, 2.9 at. %, 3.0 at. %, 3.1 at. %, 3.2 at. %, 3.3 at. %, 3.4 at. %, 3.5 at. %, 3.6 at. %, 3.7 at. %, 3.8 at. %, 3.9 at. %, 4.0 at. %.

It may be appreciated that the alloys may include the elemental constituents at levels of up to 100 at. %. Furthermore, it may be appreciated that some amount of impurities may be present in the alloy compositions, including up to 5 at. %, such as in the range of 0.1 to 5.0 at. %, including all values and increments therein. The alloys may also be formulated using commercial purity, high purity and/or ultrahigh purity feedstocks.

The glass forming metal alloy chemistries may exhibit one or more glass to crystalline transformations. For example, the glass forming chemistry may exhibit a first onset glass to crystalline transformation at a temperature in the range of 360° C. to 510° C., including all values and increments therein, measured by DTA or DSC at a heating rate of 10° C./min. A first glass to crystalline transformation peak temperature may be exhibited in the range of 400° C. to 540° C., including all values and increments therein, measured by DTA or DSC at a heating rate of 10° C./min. In addition, in some examples, the glass forming chemistry may exhibit a second onset glass to crystalline transformation at a temperature in the range of 440° C. to 610° C., including all values and increments therein, measured by DTA or DSC at a heating rate of 10° C./min. A second glass to crystalline transformation peak temperature may be exhibited in the range of 450° C. to 620° C., including all values and increments therein, measured by DTA or DSC at a heating rate of 10° C./min.

The glass forming chemistries may also exhibit a critical cooling rate of 1,000,000 K/s or less, including all values and increments therein. For example, the critical cooling rate may be in the range of 100 K/s to 1,000,000 K/s. The critical cooling rate may be understood as a minimum rate of continuous cooling just sufficient to prevent undesired transformations, such as ordering on the atomic level or further crystallization.

As noted above, it is contemplated that the alloys herein may be formed into wires having various geometries by a variety of casting methods, such as melt spinning or by the Taylor-Ulitovsky process, wherein the wires are coated with glass. As may be appreciated, the shape of the resulting wire may be altered depending on the process utilized. For example, the wire may exhibit a relatively flat shape cross-section, having a thickness, width and length, and/or a relatively circular cross-section, exhibiting a diameter.

The elemental constituents may be provided to form the iron based glass forming alloy and may be melted. Melting may occur in an arc-melting system or other melting systems such as in an induction furnace. In addition, melting and further processing may occur under an inert gas, such as argon or helium. The elemental constituents may then be formed into an ingot. The ingot may be reworked or flipped several times and re-melted to improve homogeneity. The ingots may then be formed into wire using one of a number of processes, which may depend on, for example, the desired resulting geometry of the wire.

One method to produce wire may include the melt-spinning or jet casting process whereby a liquid melt may be ejected using gas pressure onto a rapidly moving copper or other thermally conductive wheel. The wheel may be moving at a tangential velocity of 5 to 39 meters per second, including all values and increments therein, during the casting process. In addition, melt spinning may occur under an inert gas, such as helium or argon, at partial or full pressure, i.e., 1/10 to 1 atm, including all values and increments therein. Relatively long, continuous, flat wires (also called ribbons) may therefore be produced which may be 2 mm wide or less, such as in the range of 0.1 to 2 mm or 1 to 2 mm and 15 to 140 µm thick depending on the melt spun material viscosity, surface tension and wheel tangential velocity. It may be appreciated that another variant may include a wire casting process which may include a modified melt-spinning technique whereby liquid melt may be ejected using gas pressure into a rotating liquid quenchant rather than onto a thermally conductive wheel. The resulting product may form a relatively continuous wire with an irregular circular cross section which may be produced with a diameter of 20 to 140 µm thick.

Another process, called the Taylor-Ulitovsky Wire Casting Process may be used to produce relatively small diameter wires with a circular cross section. In this wire making process, metal feedstock in the form of a powder, ingot, or wire/ribbon may be held in a glass tube, typically a borosilicate composition, which may be closed at one end. This end of the tube may then be heated in order to soften the glass to a temperature at which the metal part is in a liquid state while the glass may be softened but not melted. The glass containing the liquid melt can then be drawn down and, with suitable drawing conditions, the molten metal may fill the glass capillary and a wire may be produced where the metal core may be completely coated by a glass shell. The amount of glass used in the process may be balanced by the continuous feeding of the glass tube through the inductor zone, whereas the formation of the metallic core may be restricted by the initial quantity of the iron based alloy droplet unless additional feedstock is added as the wire is produced. An alternate method may include providing the iron based alloy in rod form. The rod may then be fed into the melt zone in a semi-continuous or continuous manner to allow for the production of long wire lengths which may be generally greater than 500 m.

The microstructure of wire formed during the Taylor-Ulitovsky Process may depend on the cooling rate, which can be controlled by, for example, running the wire with or without water cooling during. Metal cores in the range of 1 to 140 µm with a glass coating, which may be from 2 to 20 µm in thickness are contemplated for production by this method. Also, depending on the needs of the application, the glass coating may be removed mechanically or by chemical methods such as dissolving in acid.

The resulting wire may exhibit a thickness or diameter of 140 microns or less, such as in the range of 1 to 139 microns, including all values and increments therein. For example, relatively flat wires may have a thickness in the range of 20 microns to 140 microns and a width in the range of 0.1 to 2 mm and relatively circular wires may exhibit a diameter in the range of 1 micron to 140 microns, or 3 microns to 50 microns, etc.

A single strand of wire may be twisted or a number of wires may be twisted together such as 3-strand, 7-strand, etc., including all values and increments in the range of 2 and 100 strands. Furthermore, multiple wires may be braided or weaved together. The twisting or braiding may be performed under tension, inducing tension and/or torsional strain.

The wire may also be coated with glass, such as may be provided in the Taylor-Ulitovsky Process. In further examples, the wire may be coated or impregnated with relatively hard particles, such as diamonds. Impregnation of the particles into the wire may occur during the forming process prior to casting of the wire, while forming of the ingots of the iron based glass forming alloy. The particles may be coated on the wire after wire formation and may include a coating such as a nickel, chromium, copper, zinc, or aluminum based coating that adheres the particles to the wires. In some examples, the hard particles may exhibit a mohs hardness of 7 or greater, which may depend on or be selected based on the material of the substrates to be cut. The hard particles may include diamond, $B_4C$, BN, SiC, $Al_2O_3$ and combinations thereof.

In some examples, the wires may exhibit a tensile strength of greater than 1 GPa, such as in the range of 1 GPa to 4 GPa, including all values and increments therein, measured at room temperature and a strain rate of $0.001\ s^{-1}$. Relatively flat wires may exhibit a tensile strength of greater than 1.5 GPa, such as in the range of 1.5 GPa to 4 GPa, including all values and increments therein, measured at room temperature and a strain rate of $0.001\ s^{-1}$. In other examples, where wire bundles of 90 wires are twisted together the relatively circular glass coated wires may exhibit a tensile strength of greater than 4 GPa, such as in the range of 4 GPa to 5 GPa, including all values and increments therein, measured at room temperature and at a strain rate of 0.001 s$^{-1}$. In addition, the individual wires may exhibit a tensile elongation of 1.5% or greater, such as in the range of 1.5 to 7%, including all values and increments therein. In some examples, the wires may exhibit a combination of a tensile strength of greater than 1 GPa and an elongation of 1.5% or greater.

As may be appreciated, the wire may be utilized to cut various substrates. The substrates may include relatively high value materials including silicon, germanium, gallium arsenide, quartz, glass, etc. Various wire cutting techniques may be used, including slurry abrasive wire cutting, where the wire is not coated with hard particles, and/or diamond saw cutting, where the base wire, formed from the glass forming alloys contemplated herein, may be coated/impregnated with diamonds or other hard particles.

For example, a wire saw may be used in cutting wafers or filaments using the wires contemplated herein. A wire saw may be understood as a machine that utilizes wire for cutting. The wire saw may include a single wire or multiple wires twisted together. Movement of the wire against the substrate may result in cutting the substrate via abrasion. FIG. 1 illustrates an example of a wire saw 100 capable of cutting a single substrate in multiple locations in a single pass of the substrate through the wire saw. A substrate 102, including, but not limited to, silicon, germanium, gallium arsenide, quartz, glass may be provided on a work table 104. To cut the substrate 102, a wire W may be fed from a supply reel 106 to a number of rollers 108. The wire W may be wrapped around the periphery of the rollers, one or more times, such as in the range of 1 to 200 times, forming a cutting region 112 between at least two of the rollers. The rollers 108 may include a number of grooves to space the wire and a drive motor 110 for driving at least one of the rollers 108. As the rollers rotate the wire may be moved over and across the rollers 108 through the cutting region 112. Eventually, the wire W may leave the cutting region 112 and be wrapped up by a take up reel 114. The substrate 102 may then be moved towards and through the cutting region 112 to cut the substrate into a number of plates or filaments. Tensioning mechanisms 116 and 118 may be provided to adjust the tension of the wire W before and after the wire travels through the cutting region 112. Guides may be provided to aid in guiding the wires between the supply reels, tension adjusting mechanism, and/or rollers. A slurry may be provided in the cutting region, such that the slurry may contact the substrate. The slurry may, or may not, include abrasive particles. In addition, the slurry may provide lubrication and/or cooling to the cutting region. Other saws contemplated may include a capstan saw, reel to reel saw or a filament saw.

The size of the kerf produced may be 140 μm or less, and may fall in the range of 1 μm to 139 μm, including all values and increment therein. Accordingly, the kerf may be of a size of 10 μm to 100 μm, including all values and increments therein. Again, the kerf may be understood herein as waste produced during the cutting process. The kerf may be the width of the cut, which in some examples, may be affected by the width of the cutting wire, the slop in cutting or abrading and the amount of material pulled out from the sides of the cut. In a further sense, the present disclosure may, therefore, relate to workpieces, such as a polysilicon ingot, which may be cut with the above mentioned wire, where the kerf produced may be 140 μm or less, as well as polysilicon wafers produced by any of the above referenced wire cutting procedures utilizing the wire disclosed herein and their associated alloy chemistries and/or morphology and/or indicated mechanical properties.

EXAMPLES

The following examples are presented for illustrative purposes and are, therefore, not meant to limit the scope of the present disclosure herein.

Alloy Design

Glass forming iron based chemistries were produced using a variety of casting methods, with both commercial purity and high purity feedstock. The processing was performed in both an inert environment and in air. Using high purity elements, 15 g alloy feedstocks of the targeted alloys were weighed out according to the atomic ratio's provided in Table 1. The feedstock material was then placed into the copper hearth of an arc-melting system. The feedstock was arc-melted into an ingot using high purity argon as a shielding gas. The ingots were flipped several times and remelted to ensure homogeneity. After mixing, the ingots were then cast in the form of a finger approximately 12 mm wide by 30 mm long and 8 mm thick.

TABLE 1

Atomic Ratio's for Alloys

| Alloy | Fe | B | C | Si | Ni | Co |
|---|---|---|---|---|---|---|
| PC7E7 | 53.50 | 16.00 | 4.50 | 0.50 | 15.50 | 10.00 |
| PC7E8 | 63.00 | 12.49 | 4.54 | 0.47 | 16.50 | 3.00 |
| PC7E8S1A1 | 67.54 | 12.49 | 0.00 | 0.47 | 16.50 | 3.00 |
| PC7E8S1A2 | 66.04 | 12.49 | 1.50 | 0.47 | 16.50 | 3.00 |
| PC7E8S1A3 | 64.54 | 12.49 | 3.00 | 0.47 | 16.50 | 3.00 |
| PC7E8S1A4 | 63.00 | 12.49 | 4.54 | 0.47 | 16.50 | 3.00 |
| PC7E8S1A5 | 65.54 | 14.49 | 0.00 | 0.47 | 16.50 | 3.00 |
| PC7E8S1A6 | 64.04 | 14.49 | 1.50 | 0.47 | 16.50 | 3.00 |
| PC7E8S1A7 | 62.54 | 14.49 | 3.00 | 0.47 | 16.50 | 3.00 |
| PC7E8S1A8 | 61.00 | 14.49 | 4.54 | 0.47 | 16.50 | 3.00 |
| PC7E8S1A9 | 63.54 | 16.49 | 0.00 | 0.47 | 16.50 | 3.00 |
| PC7E8S1A10 | 62.04 | 16.49 | 1.50 | 0.47 | 16.50 | 3.00 |
| PC7E8S1A11 | 60.54 | 16.49 | 3.00 | 0.47 | 16.50 | 3.00 |
| PC7E8S1A12 | 59.00 | 16.49 | 4.54 | 0.47 | 16.50 | 3.00 |
| PC7E8S1A13 | 61.54 | 18.49 | 0.00 | 0.47 | 16.50 | 3.00 |
| PC7E8S1A14 | 60.04 | 18.49 | 1.50 | 0.47 | 16.50 | 3.00 |
| PC7E8S1A15 | 58.54 | 18.49 | 3.00 | 0.47 | 16.50 | 3.00 |
| PC7E8S1A16 | 57.00 | 18.49 | 4.54 | 0.47 | 16.50 | 3.00 |
| PC7E8S8A1 | 63.30 | 12.55 | 4.56 | 0.00 | 16.58 | 3.01 |
| PC7E8S8A2 | 63.00 | 12.49 | 4.54 | 0.47 | 16.50 | 3.00 |
| PC7E8S8A3 | 62.69 | 12.43 | 4.52 | 0.97 | 16.42 | 2.99 |
| PC7E8S8A4 | 62.37 | 12.37 | 4.49 | 1.47 | 16.34 | 2.97 |
| PC7E8S8A5 | 62.06 | 12.30 | 4.47 | 1.96 | 16.25 | 2.96 |
| PC7E8S8A6 | 61.74 | 12.24 | 4.45 | 2.46 | 16.17 | 2.94 |
| PC7E8S8A7 | 61.43 | 12.18 | 4.43 | 2.96 | 16.09 | 2.93 |
| PC7E8S8A8 | 61.11 | 12.12 | 4.40 | 3.46 | 16.01 | 2.91 |
| PC7E8S8A6X1 | 60.18 | 12.24 | 4.45 | 2.46 | 16.17 | 4.50 |
| PC7E8S8A6X2 | 58.68 | 12.24 | 4.45 | 2.46 | 16.17 | 6.00 |
| PC7E8S8A6X3 | 57.18 | 12.24 | 4.45 | 2.46 | 16.17 | 7.50 |
| PC7E9S1A1 | 61.55 | 16.49 | 0.00 | 2.46 | 16.50 | 3.0 |
| PC7E9S1A2 | 60.05 | 16.49 | 1.50 | 2.46 | 16.50 | 3.0 |
| PC7E9S1A3 | 58.55 | 16.49 | 3.00 | 2.46 | 16.50 | 3.0 |
| PC7E9S1A4 | 57.05 | 16.49 | 4.50 | 2.46 | 16.50 | 3.0 |
| PC7E9S1A5 | 55.55 | 16.49 | 6.00 | 2.46 | 16.50 | 3.0 |
| PC7E9S1A1X1 | 60.05 | 16.49 | 0.00 | 2.46 | 16.50 | 4.50 |
| PC7E9S1A1X2 | 58.55 | 16.49 | 0.00 | 2.46 | 16.50 | 6.00 |
| PC7E9S1A1X3 | 57.05 | 16.49 | 0.00 | 2.46 | 16.50 | 7.50 |
| PC7E9S1A1X4 | 55.55 | 16.49 | 0.00 | 2.46 | 16.50 | 9.00 |
| PC7E9S1A1X5 | 54.05 | 16.49 | 0.00 | 2.46 | 16.50 | 10.50 |
| PC7E9S1A1X6 | 52.55 | 16.49 | 0.00 | 2.46 | 16.50 | 12.00 |
| PC7E9S1A1X7 | 51.05 | 16.49 | 0.00 | 2.46 | 16.50 | 13.50 |
| PC7E9S1A1X8 | 49.55 | 16.49 | 0.00 | 2.46 | 16.50 | 15.00 |
| PC7E9S1A1X9 | 48.05 | 16.49 | 0.00 | 2.46 | 16.50 | 16.50 |
| PC7E9S1A1X10 | 46.55 | 16.49 | 0.00 | 2.46 | 16.50 | 18.00 |
| PC7E9S1A1X11 | 45.05 | 16.49 | 0.00 | 2.46 | 16.50 | 19.50 |
| PC7E9S1A1X12 | 43.55 | 16.49 | 0.00 | 2.46 | 16.50 | 21.00 |
| PC7e10S2A1 | 65.03 | 15.00 | 0.00 | 0.47 | 16.50 | 3.00 |
| PC7e10S1B2 | 51.01 | 16.49 | 0.00 | 4.00 | 16.50 | 12.00 |

Flat Wire Development

Figure 2:
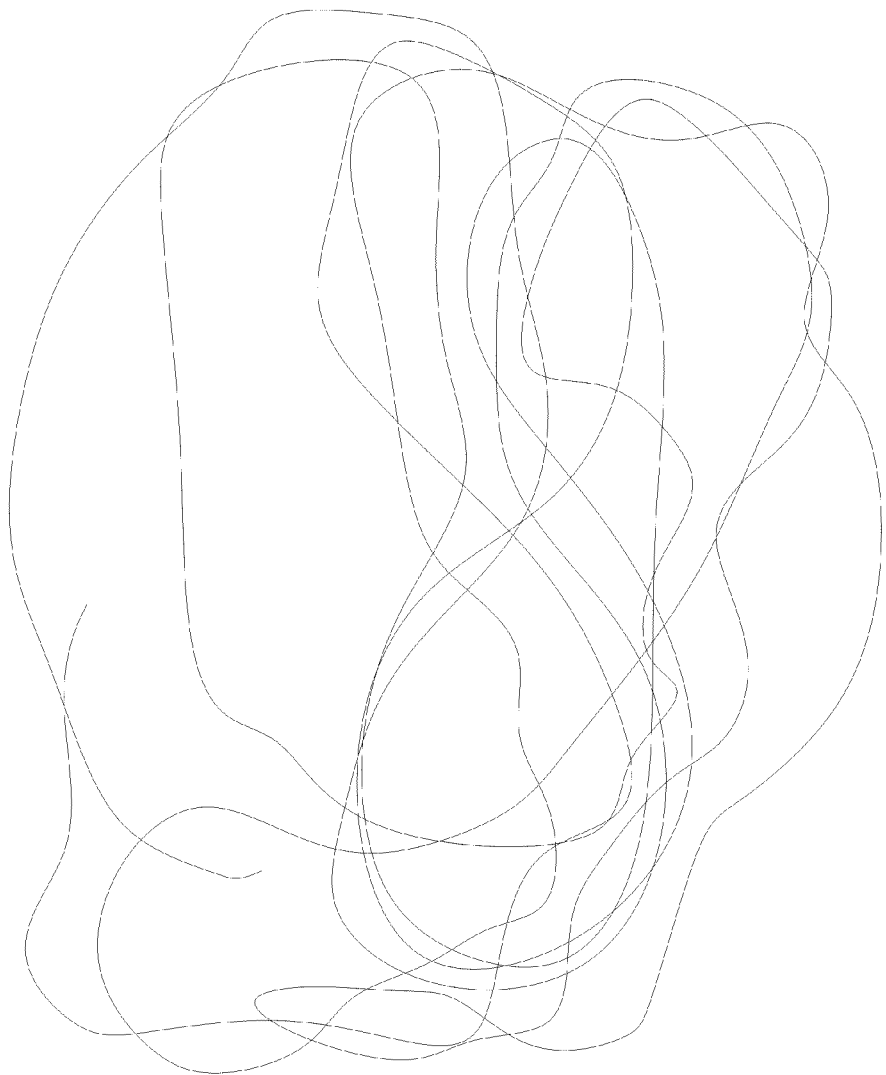
FIG. 2 illustrates an example long length of flat wire (ribbon) which was produced at 10.5 m/s.

To produce relatively flat wire, the ingot fingers produced from the alloy chemistries in Table 1 were placed in a melt-spinning chamber in a quartz crucible with a hole diameter of ~0.81 mm. The ingots were melted in a ⅓ atm helium atmosphere using RF induction and then ejected onto a 245 mm diameter copper wheel which was traveling at tangential velocities from 5 to 39 m/s. The resulting flat wires (ribbons) that were produced had widths which were typically ~1.25 mm and thickness from 20 to 140 μm and lengths that were in the range of 10 to 30 m. For the purposes of this study, only 10.5 m/s flat wire date is presented which typically had thicknesses in the range of 70 to 80 p.m. An example piece of flat wire (ribbon) which was processed at 10.5 m/s is shown in FIG. 2.

Thermal Analysis of Flat Wire

Thermal analysis was done on the as-solidified flat wires using a Perkin Elmer DTA-7 system with the DSC-7 option. Differential thermal analysis (DTA) and differential scanning calorimetry (DSC) as performed at a heating rate of 10° C./minute with samples protected from oxidation through the use of flowing ultrahigh purity argon. In Table 2, the DSC data related to the glass to crystalline transformation is shown for the alloys that have been melt-spun at 10.5 m/s. As can be seen, the majority of samples exhibit glass to crystalline transformations verifying that the as-spun state contains significant fractions of metallic glass. The glass to crystalline transformation occurs in either one stage or two stages in the range of temperature from 366° C. to 506° C. and with enthalpies of transformation from −8.9 J/g to −173.9 J/g.

TABLE 2

DSC Data for Glass to Crystalline Transformations at 10.5 m/s

| Alloy | Glass | Peak #1 Onset (°C.) | Peak #1 Peak (°C.) | ΔH (−J/g) | Peak #2 Onset (°C.) | Peak #2 Peak (°C.) | ΔH (−J/g) |
|---|---|---|---|---|---|---|---|
| PC7E7 | Y | 468 | 473 | 127.2 | | | |
| PC7E8 | Y | 433 | 444 | 46.2 | 476 | 481 | 99.0 |
| PC7E8S1A1 | N | | | | | | |
| PC7E8S1A2 | N | | | | | | |
| PC7E8S1A3 | N | | | | | | |
| PC7E8S1A4 | Y | 435 | 450 | 164.0 | | | |
| PC7E8S1A5 | Y | 366 | 403 | 22.2 | 461 | 470 | 55.3 |
| PC7E8S1A6 | Y | 422 | 438 | 53.2 | 470 | 479 | 107.3 |
| PC7E8S1A7 | Y | 440 | 449 | 24.4 | 471 | 477 | 75.5 |
| PC7E8S1A8 | Y | 447 | 455 | 10.7 | 471 | 476 | 39.4 |
| PC7E8S1A9 | Y | 427 | 434 | 10.0 | 440 | 451 | 85.4 |
| PC7E8S1A10 | Y | 445 | 467 | 122.0 | | | |
| PC7E8S1A11 | Y | 463 | 470 | 117.1 | | | |
| PC7E8S1A12 | Y | 466 | 471 | 122.0 | | | |
| PC7E8S1A13 | Y | 451 | 460 | 133.1 | | | |
| PC7E8S1A14 | Y | 461 | 467 | 122.3 | | | |
| PC7E8S1A15 | Y | 470 | 476 | 115.9 | | | |
| PC7E8S1A16 | Y | 506 | 532 | 17.0 | | | |
| PC7E8S8A1 | Y | 432 | 447 | 173.9 | | | |
| PC7E8S8A2 | Y | 433 | 444 | 46.2 | 476 | 481 | 99.0 |
| PC7E8S8A3 | Y | 436 | 446 | 38.7 | 479 | 485 | 72.9 |
| PC7E8S8A4 | Y | 443 | 453 | 36.7 | 485 | 491 | 74.0 |
| PC7E8S8A5 | Y | 453 | 464 | 34.9 | 491 | 498 | 64.4 |
| PC7E8S8A6 | Y | 466 | 474 | 49.7 | 495 | 507 | 39.8 |
| PC7E8S8A7 | Y | 466 | 475 | 54.8 | 504 | 513 | 68.0 |
| PC7E8S8A8 | Y | 476 | 484 | 42.0 | 510 | 522 | 14.0 |
| PC7E8S8A6X1 | Y | 456 | 464 | 21.5 | 488 | 497 | 7.8 |
| PC7E8S8A6X2 | Y | 455 | 464 | 13.5 | 490 | 498 | 2.5 |
| PC7E8S8A6X3 | Y | 455 | 463 | 8.9 | 491 | 499 | 1.9 |
| PC7E9S1A1 | Y | 461 | 467 | 60.0 | 475 | 480 | 87.0 |
| PC7E9S1A2 | Y | 469 | 475 | 131.0 | 606 | 618 | 7.7 |
| PC7E9S1A3 | Y | 476 | 482 | 120.0 | | | |
| PC7E9S1A4 | Y | 496 | 502 | 134.0 | | | |
| PC7E9S1A5 | Y | 497 | 502 | 133.0 | | | |
| PC7E9S1A1X1 | Y | 463 | 468 | 50.0 | 476 | 483 | 76.0 |
| PC7E9S1A1X2 | Y | 462 | 467 | 50.0 | 477 | 484 | 81.0 |
| PC7E9S1A1X3 | Y | 465 | 473 | 53.0 | 479 | 486 | 54.0 |
| PC7E9S1A1X4 | Y | 463 | 470 | 49.6 | 480 | 487 | 54.6 |
| PC7E9S1A1X5 | Y | 465 | 471 | 15.2 | 482 | 490 | 15.3 |
| PC7E9S1A1X6 | Y | 465 | 472 | 18.0 | 483 | 490 | 26.0 |
| PC7E9S1A1X7 | Y | 463 | 471 | 25.6 | 484 | 491 | 36.0 |
| PC7E9S1A1X8 | Y | 466 | 472 | 24.0 | 483 | 491 | 34.9 |
| PC7E9S1A1X9 | Y | 465 | 472 | 12.0 | 487 | 492 | 15.9 |
| PC7E9S1A1X10 | Y | 456 | 468 | 24.1 | 488 | 494 | 60.3 |
| PC7E9S1A1X11 | Y | 461 | 472 | 10.3 | 491 | 496 | 15.8 |
| PC7E9S1A1X12 | Y | 461 | 473 | 26.5 | 492 | 498 | 40.6 |
| PC7e10S2A1 | Y | 395 | 419 | 21.4 | 460 | 465 | 55.1 |
| PC7e10S1B2 | Y | 488 | 494 | 60 | 501 | 507 | 35 |

Overlapping peaks, peak 1 and peak 2 enthalpy combined

Tensile Properties of Flat Wire

The mechanical properties of the flat wires were obtained at room temperature using microscale tensile testing. The testing was carried out in a commercial tensile stage made by Fullam which was monitored and controlled by a MTEST Windows software program. The deformation was applied by a stepping motor through the gripping system while the load was measured by a load cell that was connected to the end of one gripping jaw. Displacement was obtained using a Linear Variable Differential Transformer (LVDT) which was attached to the two gripping jaws to measure the change of gauge length. Before testing, the thickness and width of a ribbon were carefully measured at least three times at different locations in the gauge length. The average values were then recorded as gauge thickness and width, and used as input parameters for subsequent stress and strain calculation. The initial gauge length for tensile testing was set at ~9 mm with the value determined after the ribbon was fixed by measuring the wire span between the front faces of the two gripping jaws. All tests were performed under displacement control with a strain rate of ~0.001 s$^{-1}$. A summary of the tensile test results including total elongation, ultimate tensile strength, and Young's Modulus, is shown in Table 3 for each alloy presented in Table 1 when melt-spun at 10.5 m/s. Note that two samples, PC7E8S1A12 and PC7E8S1A16 were too brittle to test. Note also that each sample measurement was performed in triplicate as occasional macrodefects arising from the melt-spinning process can lead to localized areas with reduced properties. As can be seen in Table 3, the tensile strength values are relatively high and vary from 1.08 GPa to 3.72 GPa while the total elongation values are also very high and vary from 1.72% to 6.80%.

TABLE 3

Summary of Tensile Test Results at 10.5 m/s

| Alloy | Total Elongation (%) | Ultimate Tensile Strength (GPa) | Young's Modulus (GPa) |
|---|---|---|---|
| PC7e7 | 2.43 | 2.70 | 139.0 |
|  | 1.54 | 1.34 | 105.7 |
|  | 2.16 | 1.83 | 125.0 |
| PC7e8 | 4.16 | 2.68 | 124.6 |
|  | 2.43 | 1.48 | 116.1 |
|  | 3.61 | 2.38 | 126.1 |
| PC7E8S1A1 | 2.85 | 1.45 | 106.2 |
|  | 3.26 | 1.68 | 117.5 |
|  | 2.87 | 1.42 | 104.0 |
| PC7E8S1A2 | 2.56 | 1.41 | 104.4 |
|  | 2.07 | 1.49 | 131.4 |
|  | 2.43 | 1.48 | 131.0 |
| PC7E8S1A3 | 2.98 | 1.98 | 130.5 |
|  | 2.77 | 1.75 | 124.2 |
|  | 2.83 | 1.15 | 119.3 |
| PC7E8S1A4 | 2.00 | 1.23 | 125.1 |
|  | 3.81 | 1.38 | 73.8 |
|  | 2.58 | 1.19 | 92.7 |
| PC7E8S1A5 | 3.04 | 2.01 | 112.5 |
|  | 3.94 | 2.38 | 121.1 |
|  | 3.21 | 1.94 | 112.1 |
| PC7E8S1A6 | 2.33 | 1.57 | 123.3 |
|  | 2.33 | 1.50 | 116.1 |
|  | 4.27 | 2.76 | 128.7 |
| PC7E8S1A7 | 4.99 | 2.79 | 115.3 |
|  | 4.53 | 2.49 | 104.9 |
|  | 4.42 | 2.74 | 138.7 |
| PC7E8S1A8 | 3.75 | 2.09 | 103.5 |
|  | 6.09 | 3.15 | 119.3 |
|  | 2.40 | 1.93 | 129.7 |
| PC7E8S1A9 | 2.80 | 1.92 | 137.5 |
|  | 3.08 | 1.76 | 116.3 |
|  | 3.73 | 2.45 | 116.3 |
| PC7E8S1A10 | 4.02 | 2.67 | 121.6 |
|  | 3.93 | 2.54 | 119.0 |
|  | 4.02 | 2.51 | 117.1 |
| PC7E8S1A11 | 1.72 | 1.08 | 119.7 |
|  | 2.65 | 1.41 | 104.4 |
|  | 2.10 | 1.34 | 111.6 |
| PC7E8S1A13 | 4.39 | 2.59 | 121.1 |
|  | 3.95 | 2.42 | 121.9 |
|  | 4.69 | 2.42 | 97.2 |
| PC7E8S1A14 | 4.94 | 2.40 | 107.1 |
|  | 3.38 | 1.91 | 113.4 |
|  | 5.66 | 2.31 | 82.4 |
| PC7E8S1A15 | 2.16 | 1.26 | 109.4 |
|  | 2.60 | 1.39 | 105.8 |
|  | 2.08 | 1.36 | 131.4 |
| PC7E8S8A1 | 5.70 | 2.47 | 104.8 |
|  | 3.93 | 2.11 | 112.5 |
|  | 5.67 | 2.15 | 86.0 |
| PC7E8S8A2 | 4.77 | 2.35 | 109.8 |
|  | 5.66 | 2.83 | 113.8 |
|  | 4.57 | 2.52 | 100.0 |
| PC7E8S8A3 | 3.05 | 1.80 | 106.6 |
|  | 4.41 | 2.21 | 92.7 |
|  | 3.06 | 1.81 | 105.7 |
| PC7E8S8A4 | 2.61 | 1.37 | 96.8 |
|  | 2.56 | 1.51 | 105.8 |
|  | 2.59 | 1.37 | 93.2 |
| PC7E8S8A5 | 5.29 | 2.58 | 112.9 |
|  | 5.24 | 2.47 | 100.0 |
|  | 5.94 | 2.63 | 96.8 |
| PC7E8S8A6 | 5.96 | 2.93 | 104.8 |
|  | 4.65 | 2.52 | 105.8 |
|  | 4.31 | 3.32 | 157.4 |
| PC7E8S8A7 | 2.58 | 2.09 | 148.5 |
|  | 5.04 | 2.98 | 121.5 |
|  | 4.45 | 2.75 | 123.3 |
| PC7E8S8A8 | 6.80 | 2.69 | 118.8 |
|  | 5.17 | 2.12 | 104.4 |
|  | 4.92 | 3.45 | 149.3 |
| PC7E8S8A6X1 | 4.87 | 3.05 | 124.0 |
|  | 4.33 | 2.95 | 144.6 |
|  | 4.26 | 2.92 | 115.4 |
| PC7E8S8A6X2 | 4.45 | 2.79 | 132.2 |
|  | 4.77 | 2.83 | 120.2 |
|  | 4.21 | 3.03 | 125.2 |
| PC7E8S8A6X3 | 4.07 | 2.98 | 148.4 |
|  | 3.71 | 2.76 | 139.6 |
|  | 4.33 | 2.89 | 147.9 |
| PC7E9S1A1X1 | 4.67 | 2.72 | 114.5 |
|  | 4.77 | 3.21 | 142.0 |
|  | 2.72 | 2.27 | 164.2 |
| PC7E9S1A1X2 | 4.51 | 3.21 | 146.4 |
|  | 4.27 | 3.15 | 152.3 |
|  | 3.84 | 3.30 | 172.0 |
| PC7E9S1A1X3 | 5.58 | 2.64 | 105.8 |
|  | 4.77 | 2.36 | 110.7 |
|  | 4.45 | 2.35 | 117.8 |
| PC7E9S1A1X4 | 4.59 | 2.93 | 123.6 |
|  | 4.62 | 2.91 | 134.5 |
|  | 4.25 | 3.34 | 153.2 |
| PC7E9S1A1X5 | 4.64 | 3.19 | 151.5 |
|  | 5.66 | 3.70 | 129.2 |
|  | 4.31 | 2.76 | 122.7 |
| PC7E9S1A1X6 | 4.07 | 3.17 | 152.7 |
|  | 5.11 | 2.97 | 128.4 |
|  | 3.82 | 2.90 | 149.9 |
| PC7E9S1A1X7 | 4.46 | 3.09 | 140.6 |
|  | 5.17 | 2.80 | 133.7 |
|  | 3.87 | 3.16 | 156.1 |
| PC7E9S1A1X8 | 4.65 | 3.07 | 131.8 |
|  | 3.87 | 3.12 | 154.2 |
|  | 4.30 | 3.13 | 162.7 |
| PC7E9S1A1X9 | 5.36 | 2.93 | 133.5 |
|  | 4.28 | 2.75 | 141.6 |
|  | 3.87 | 3.17 | 156.2 |
| PC7E9S1A1X10 | 3.89 | 2.52 | 152.3 |
|  | 3.91 | 2.67 | 156.0 |
|  | 3.66 | 3.07 | 161.1 |
| PC7E9S1A1X11 | 4.05 | 2.38 | 111.9 |
|  | 3.97 | 2.66 | 118.8 |
|  | 2.98 | 2.39 | 128.5 |
| PC7E9S1A1X12 | 4.35 | 2.85 | 127.2 |
|  | 4.33 | 2.58 | 118.2 |
|  | 4.60 | 2.67 | 113.2 |
| PC7E10S2A1 | 3.24 | 2.15 | 107.61 |
|  | 4.29 | 2.86 | 113.56 |
|  | 3.83 | 2.74 | 121.38 |
| PC7E10S1B2 | 5.46 | 3.72 | 104.21 |
|  | 4.02 | 3.63 | 135.32 |
|  | 4.08 | 3.71 | 126.31 |

Circular Cross Sectional Wire

Figure 3:
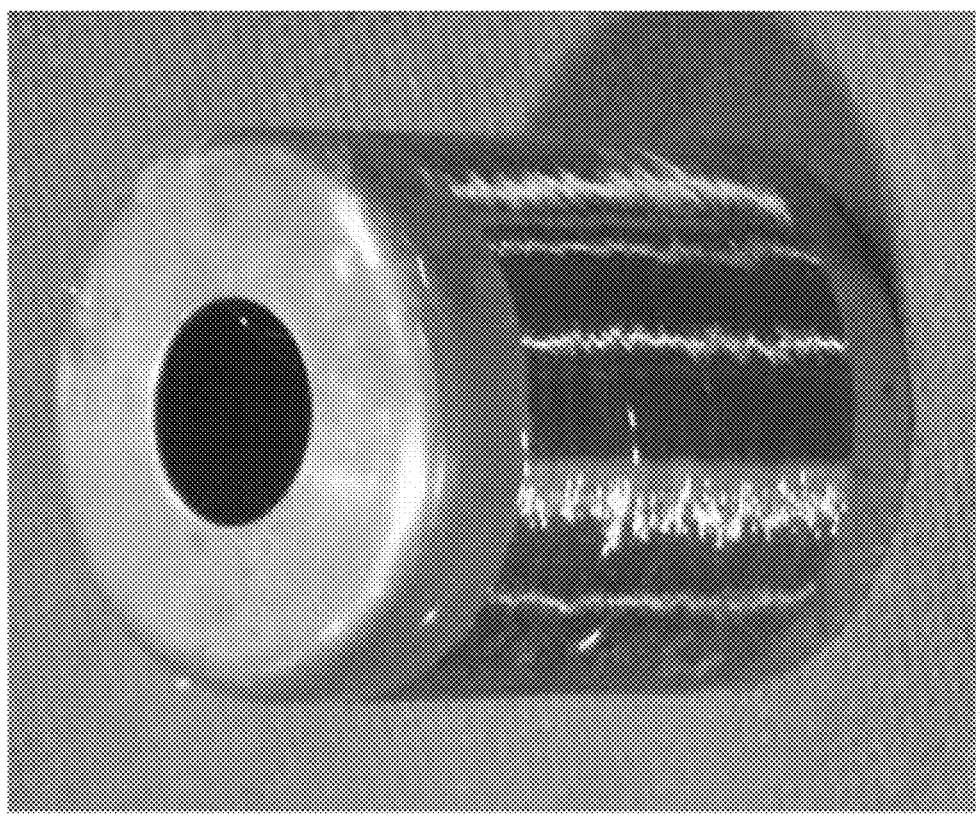
FIG. 3 illustrates an example spool which is shown of glass coated microwire of Run #6.

Using a Taylor-Ulitovsky wire making process, numerous runs of two alloys, PC7E10S2A1 and PC7E10S1B2 listed in Table 1 were produced. Note that the two alloys were processed into ingots and cast into fingers in a similar fashion to those utilized for flat wires. Approximately 20 small representative Taylor-Ulitovsky wire making runs (averaging ~300 m) were produced at various conditions including with and without water cooling, and at various thickness's from ~3 to ~50 µm in diameter. Additionally, six longer lengths of wire were produced and put onto spools. The wire lengths, total diameters and glass coating thickness's can be seen in Table 4. In FIG. 3, a picture can be seen of the spool which is shown of glass coated microwire of Run #6.

TABLE 4

Details of Taylor-Ulitovsky Glass Coated Wire Production

| Run # | Alloy | Wire Length, (m) | Total Wire Diameter, (μm) | Metal Core Diameter, (μm) |
|---|---|---|---|---|
| Spool #1 | PC7e10S1B2 | 1000 | 22-23 | 17-18 |
| Spool #2 | PC7e10S1B2 | 5000 | 3-5 | 2-3 |
| Spool #3 | PC7e10S2A1 | 1500 | 24-26 | 17-18 |
| Spool #4 | PC7e10S2A1 | 700 | 22-23 | 17-18 |
| Spool #5 | PC7e10S2A1 | 1650 | 21-23 | 17-18 |
| Spool #6 | PC7e10S2A1 | 600 | 45-50 | 43-47 |

Thermal Analysis of Circular Cross Sectional Wire

Figure 4:
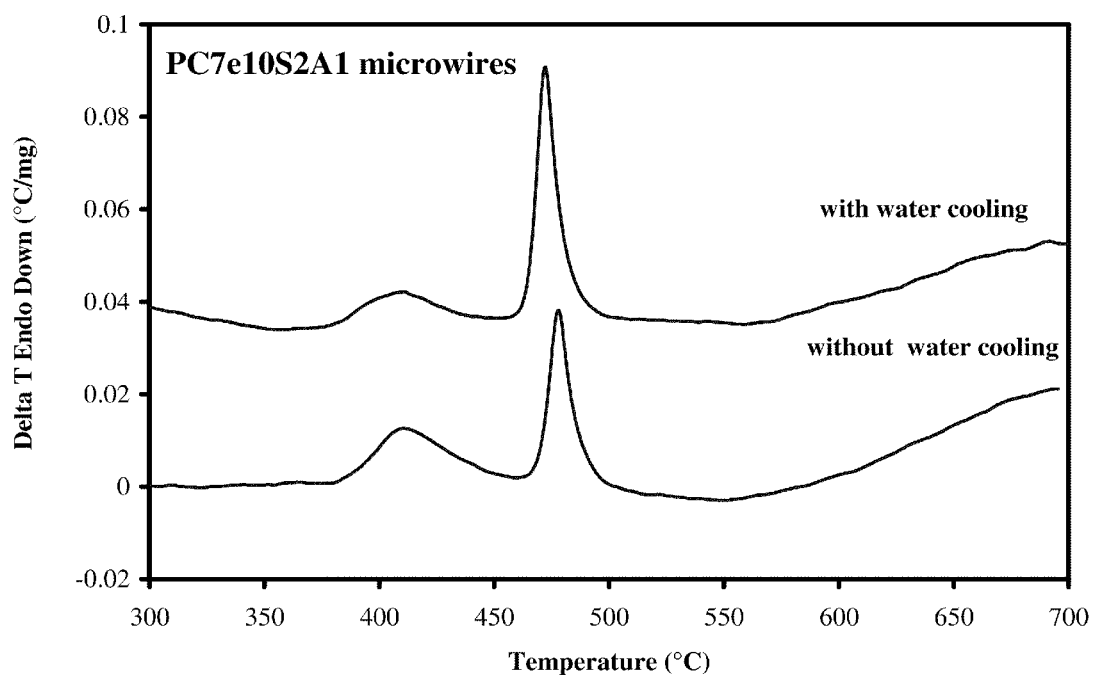
FIG. 4 illustrates an example of a DTA analysis of the PC7E10S2A1 alloy when produced as a glass coated circular wire; top curve with water cooling, bottom curve, without water cooling.
Figure 5:
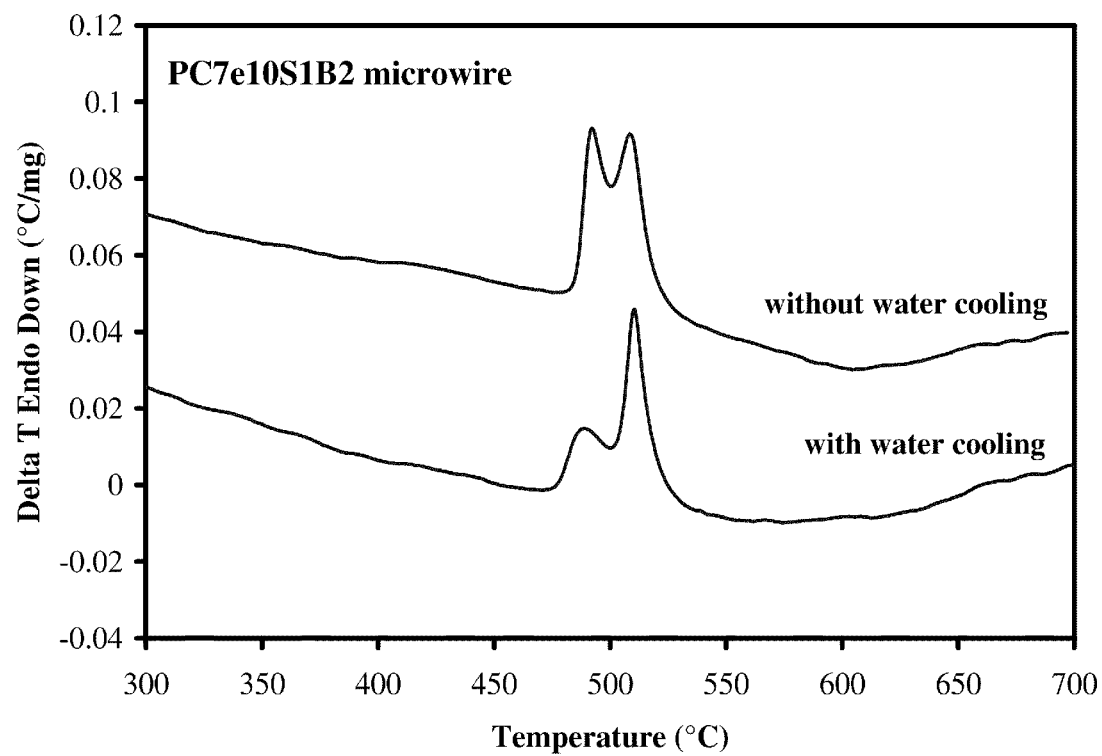
FIG. 5 illustrates an example of a DTA analysis of the PC7E10S1B2 alloy when produced as a glass coated circular wire; top curve without water cooling, bottom curve, with water cooling.
Figure 6:
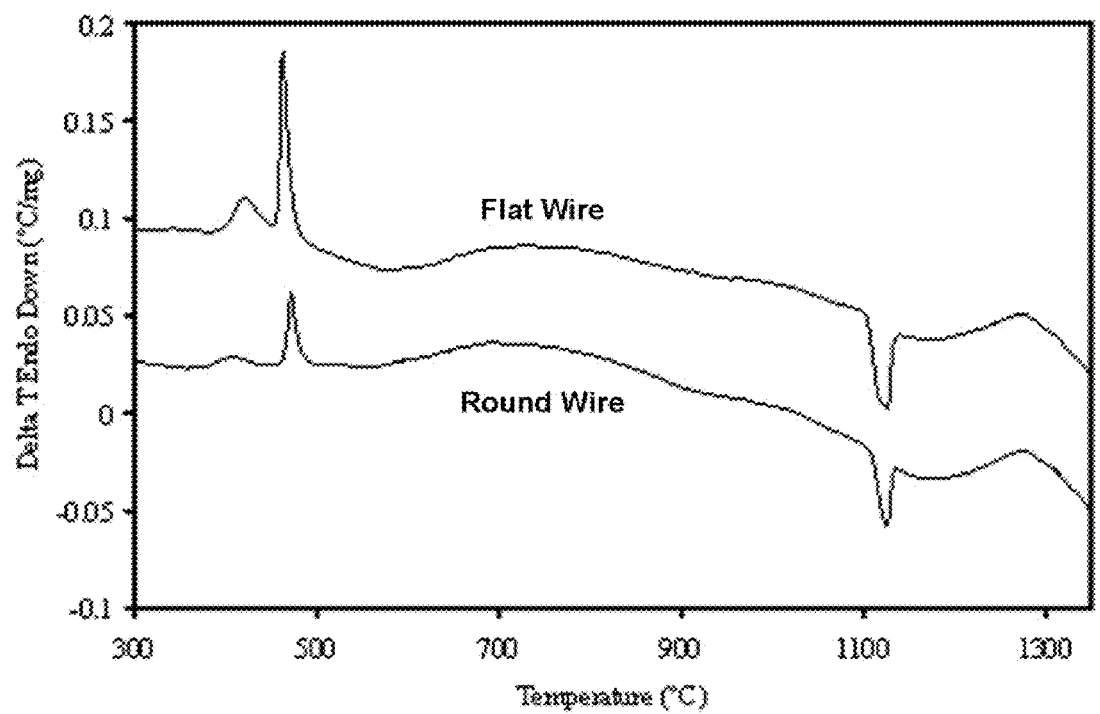
FIG. 6 illustrates an example of a DTA analysis of the PC7E10S2A1 alloy; top curve flat wire bottom curve, glass coated circular wire.
Figure 7:
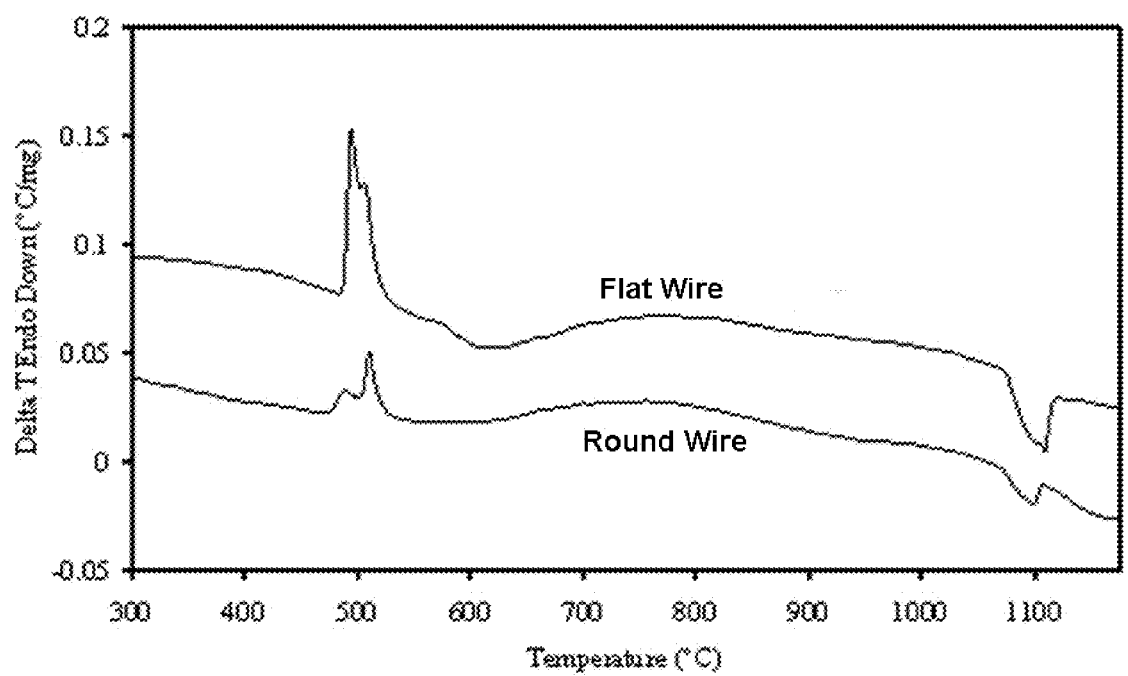
FIG. 7 illustrates an example of a DTA analysis of the PC7E10S1B2 alloy; top curve flat wire, bottom curve, glass coated circular wire.

Thermal analysis was performed on the as-solidified glass coated microwires using a Perkin Elmer DTA-7 system with the DSC-7 option. Differential thermal analysis (DTA) and differential scanning calorimetry (DSC) was performed at a heating rate of 10° C./minute with samples protected from oxidation through the use of flowing ultrahigh purity argon. In Table 5, the DSC data related to the glass to crystalline transformation is shown for selected circular cross sectional glass coated microwires which have been processed with and without water cooling. As indicated, all samples exhibit relatively large glass to crystalline transformations, which may indicate that the as-solidified wire state contains significant fractions of metallic glass. Note that the values of crystallization enthalpy are lowered, which may be due to the fact that the wire were measured with the glass coating intact. In FIGS. 4 and 5, the water cooled and non water cooled DTA curves are shown for the PC7E10S2A1 and PC7E10S1B2 alloys respectively. As can clearly be seen in the Figures, the alloys are insensitive to processing condition and the presence of water cooling due to their inherent high level of glass forming ability. In FIGS. 6 and 7, the DTA curves are compared for the PC7E10S2A1 and PC7E10S1B2 wires respectively which are in both flat wire (ribbon) and glass coated circular wire forms. As shown in these Figures, the crystallization and melting peaks are similar, indicating that very similar chemistries and structures were achieved for each alloy in both a flat wire (ribbon) and glass coated circular wire.

TABLE 5

Thermal Analysis Summary For Glass Coated Microwires

| | | Crystallization Peaks | | | | | |
|---|---|---|---|---|---|---|---|
| | | Peak #1 | | | Peak #2 | | |
| Alloy | Water Cooling | Onset (° C.) | Temp (° C.) | ΔH (−J/g) | Onset (° C.) | Temp (° C.) | ΔH (−J/g) |
| PC7E10S2A1 | Y | 385 | 406 | 9.8 | 465 | 472 | 35.5 |
| PC7E10S2A1 | N | 389 | 411 | 23.8 | 470 | 478 | 32.0 |
| PC7E10S1B2 | Y | 478 | 487 | — | 503 | 510 | 69.1* |
| PC7E10S1B2 | N | 487 | 492 | — | 502 | 509 | 84.3* |

*ΔH from peaks 1 and 2 due to overlapping nature

SEM Analysis of Circular Cross Sectional Wire

Figure 8:
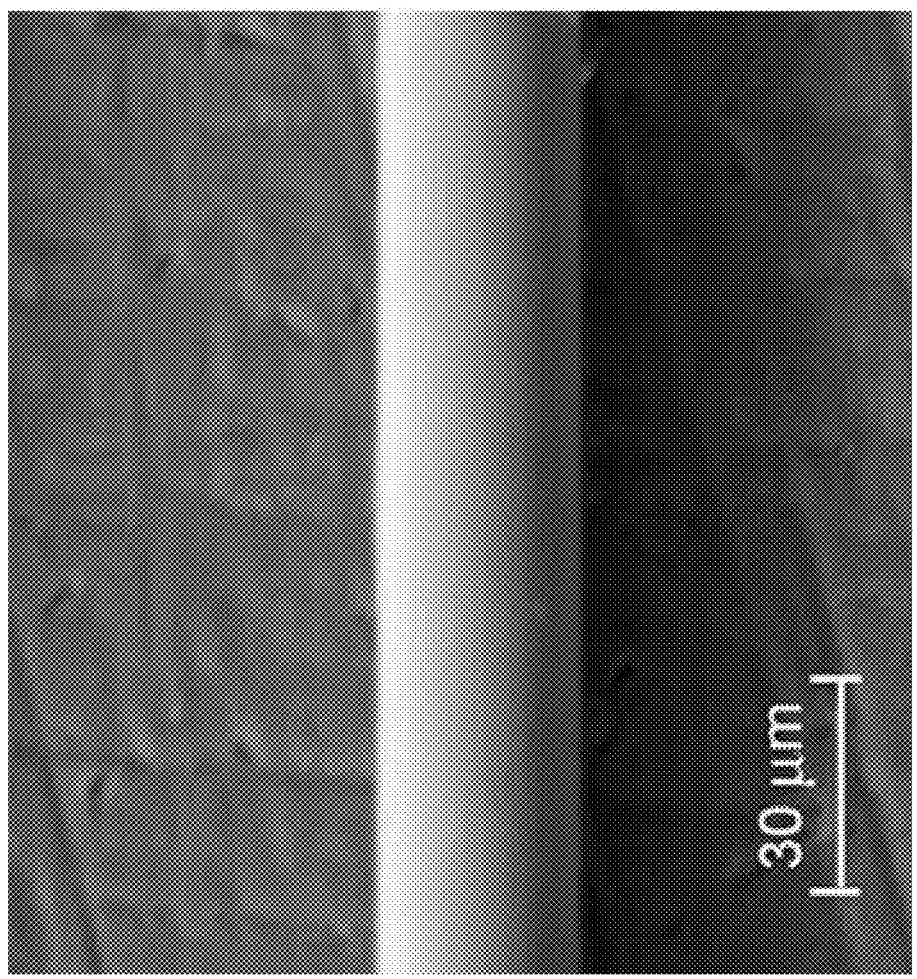
FIG. 8 illustrates an example of an SEM BSE image of the Spool #6 microwire showing the wire with the glass coating.
Figure 9:
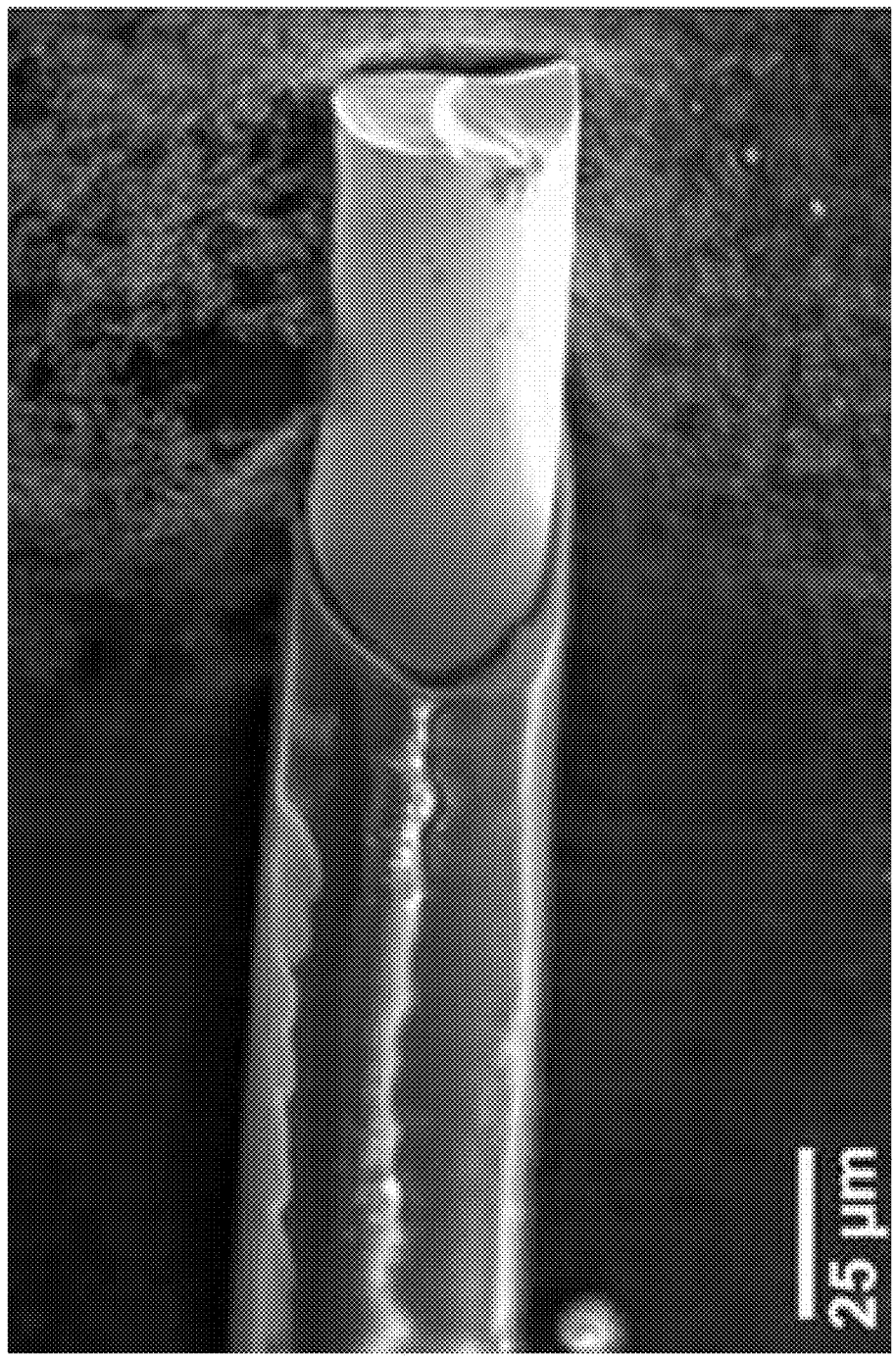
FIG. 9 illustrates an example of an SEM BSE image of the Spool #6 microwire showing the wire with the glass coating and with the coating removed near the tip showing the bare wire.
Figure 10:
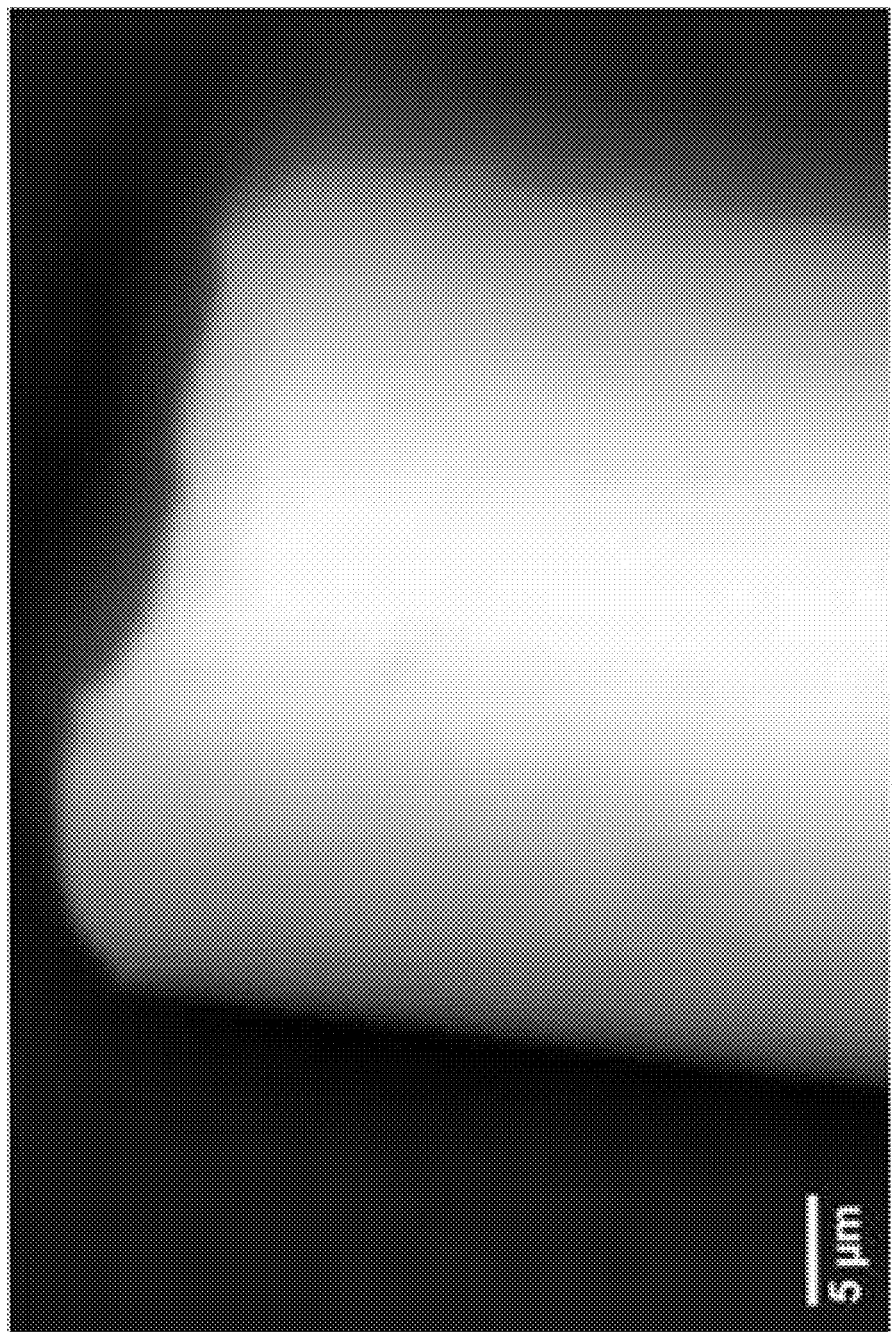
FIG. 10 illustrates an example of an SEM BSE image of the Spool #6 microwire showing a close-up of the wire structure with the glass coating removed.

To examine the structure of the circular cross sectional wires, scanning electron microscopy (SEM) was performed on selected samples. The structure of the samples was observed using a Zeiss EVO-60 scanning electron microscope with an electron beam energy of 17.5 kV, a filament current of 2.4 A, a spot size setting of 1000. In FIG. 8, a backscattered electron image (BSE) is shown of microwire from Spool #6 showing the wire with the glass coating intact. In FIG. 9, a BSE image is shown of the Spool #6 microwire showing the wire with the glass coating and with the coating removed near the tip showing the bare wire. In FIG. 10, a high magnification BSE image is shown of the microwire of Spool #6 showing a close-up of the wire structure with the glass coating removed. Consistent with the DTA/DSC results, the structure is not expected to be resolved due to the primarily glass nature of the wires. However, nanoscale structures which may or may not be present would not be expected to be resolved due to the resolution limits inherent with backscattered electron detection.

Tensile Testing of Circular Cross Sectional Wire

Figure 11:
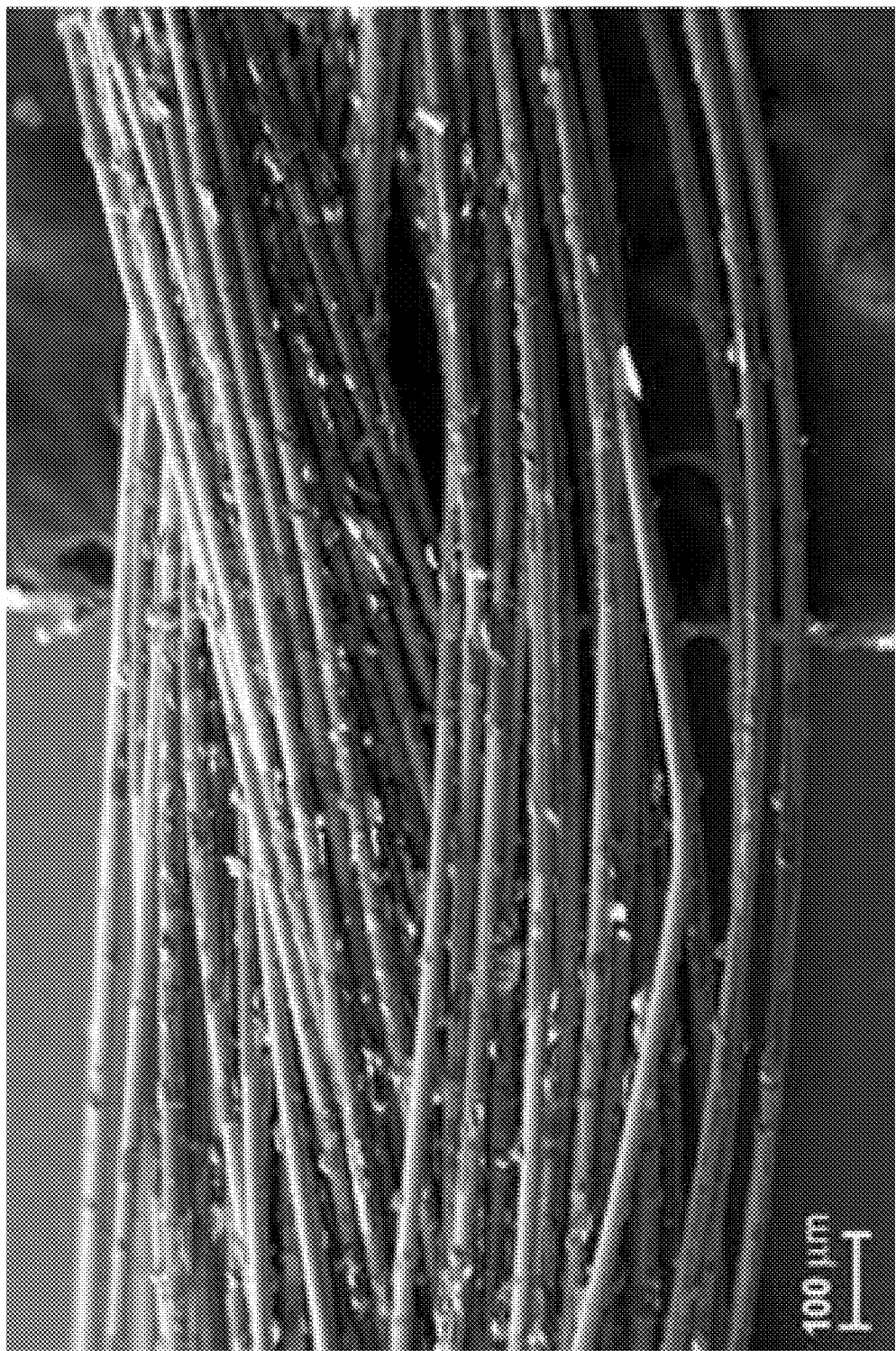
FIG. 11 illustrates an example of an SEM image of the microwire rope from Spool #6 which was used for tensile testing.

Initial measurements of the glass coated microwires were obtained at room temperature using microscale tensile testing in the same system and with a similar methodology as presented before for the flat wire samples. The main difference was that the existing load cell (1,000 lb) appeared to be too large to measure single wire specimens. In this case, measurements were performed utilizing a twisted wire rope. For Spool #6, ninety lengths of wire were cut and then all ninety wires were twisted together to form a wire rope as shown in FIG. 11.

Figure 12:
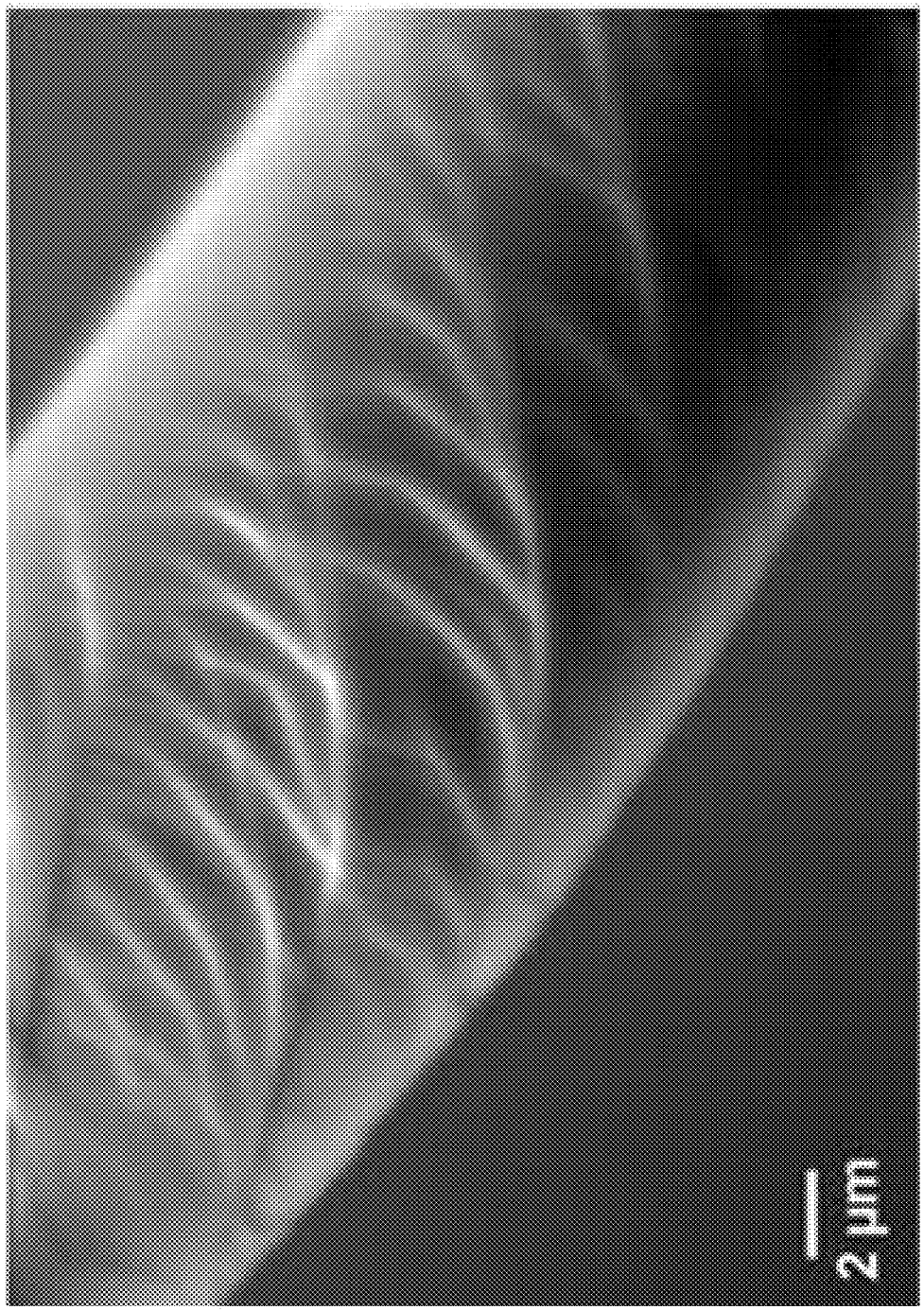
FIG. 12 illustrates an example of an SEM BSE image of a microwire from Spool #6 which was twisted under tension to produce both tensile and torsional strains.

Tensile testing was performed and the resulting cordage was examined in the SEM. The cross sectional areas of the actual wires were measured and the number of wires broken was counted. This allowed an estimate of the tensile strength values as shown in Table 6. Note that the tensile elongation values are not presented since in some cases, individual wires appeared to slip during the testing, resulting in anomalously high and inaccurate elongation values. Based on the DTA, SEM, and measured tensile strength values, it is believed that a very similar structure is obtained in the PC7E10S2A1 and PC7E10S1B2 alloys in both flat wire and glass coated circular wire forms. Thus, it is believed that the tensile elongation values would also be similar. It is possible and perhaps probable that the tensile properties of the circular wire are higher than the flat wire since the circular cross section which would be expected to be more favorable for shear band interaction. An indication of this is shown in FIG. 12 where the interacting shear bands of a wire from Spool #6 can be clearly seen after this wire was put under tension and then twisted to introduce both tensile and torsional strains.

TABLE 6

Tensile Results For Glass Coated Microwires

| | Sample Geometry | | | |
|---|---|---|---|---|
| Test # | Core Diameter, (μm) | # of Microwires in a Rope | Gage Length, mm | Tensile Strength, GPa |
| 1 | 28-35 | 90 | 7.92 | 4.5 |
| 2 | 28-35 | 90 | 8.06 | 4.2 |

TEM Studies on Glass Coated Microwire

Figure 13:
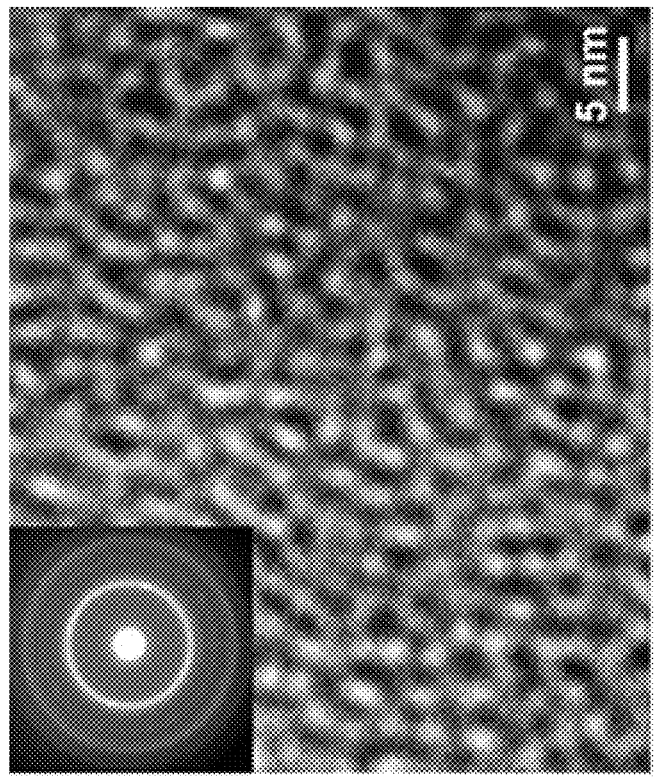
FIG. 13 illustrates an example of two TEM images of a microwire from Spool #6. Note that in the corner of each micrograph, selected area diffraction patterns are shown.
Figure 13:
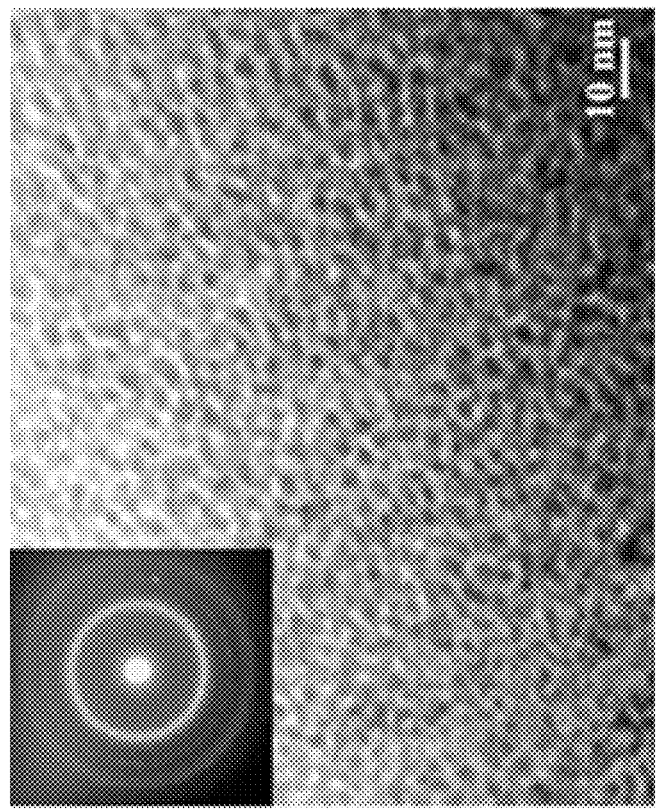

To examine the microstructures in microwires, TEM microscopy was used. To obtain an electronic-transparent area for TEM observation, samples of the Spool #6 PC7E10S2A1 wires were mounted on a copper disk. The resulting sample was ion milled using a Gatan Precision Ion Polishing System (PIPS) which was operated at an ion beam energy level of ~4 keV. The ion beam incident angle was 10° first, then reduced to 7° after penetration, and finished up by further reducing 4°. After ion milling, some fractions of the wires had thin areas appropriate for TEM microscopy. In FIG. 12, TEM micrographs are shown of the Spool #6 PC7E1052A1 microwire with both pictures taken at different magnification in thin areas near the center of the wire. In the left hand corners of both micrograph of FIG. 13, selected area diffraction patterns are shown. As seen, from the diffraction pattern, the structure of the wire is found to be primarily amorphous with individual crystalline phases seen from their diffraction spots. As seen by the micrograph, the small crystalline phases or clusters are very small and typically in the range of 1 to 3 nm. Due to the uniformly small structure, it is believed that these small crystalline phases/clusters form through a spinodal type transformation. The structure of the wire can thus be described as a spinodal glass matrix microconstituent structure since isolated crystalline phases/clusters exist in a glass matrix.

The foregoing description of several methods and embodiments has been presented for purposes of illustration. It is not intended to be exhaustive or to limiting and many modifications and variations are possible in light of the above teachings.

What is claimed is:

1. A wire, comprising:
an iron based glass forming alloy including iron present in the range of 43.0 to 68.0 atomic percent, boron present in the range of 12.0 to 19.0 atomic percent, nickel present in the range of 15.0 to 17.0 atomic percent, cobalt present in the range of 2.0 to 21.0 atomic percent, optionally carbon present in the range of 0.1 to 6.0 atomic percent and optionally silicon present in the range of 0.4 to 4.0 atomic percent, wherein said wire has a thickness of 140 μm or less and wherein said wire includes spinodal glass matrix microconstituents.

2. The wire of claim 1, wherein said wire has a width of 2 mm or less.

3. The wire of claim 1, wherein said wire has a diameter of less than 140 μm.

4. The wire of claim 1, wherein said wire has a length of 500 meters or greater.

5. The wire of claim 1, further comprising a plurality of wires twisted together.

6. The wire of claim 5, wherein up to 100 wires are twisted together.

7. The wire of claim 1, wherein said wire exhibits spinodal glass matrix microconstituent structures.

8. The wire of claim 1, wherein said wire exhibits associations of structural units in the solid phase in the range of 0.1 nm to 1.0 microns in size.

9. The wire of claim 1, wherein said wire exhibits a tensile strength of greater than 1 GPa.

10. The wire of claim 1, wherein said wire exhibits a tensile elongation of 1.5% or greater.

11. The wire of claim 1, wherein said wire is coated with glass.

12. The wire of claim 1, wherein said wire is impregnated with particles having a mohs hardness of 7 or greater.

13. The wire of claim 1, wherein said wire is coated with particles having a mohs hardness of 7 or greater.

14. A method of cutting substrates, comprising:
abrading a substrate with a wire including an iron based glass forming alloy including iron present in the range of 43.0 to 68.0 atomic percent, boron present in the range of 12.0 to 19.0 atomic percent, nickel present in the range of 15.0 to 17.0 atomic percent, cobalt present in the range of 2.0 to 21.0 atomic percent, optionally carbon present in the range of 0.1 to 6.0 atomic percent and optionally silicon present in the range of 0.4 to 4.0 atomic percent, wherein said wire has a thickness of 140 μm or less and wherein said wire includes spinodal glass matrix microconstituents.

15. The method of claim 14, wherein said wire has a length of 500 meters or greater.

16. The method of claim 14, wherein said abrasion is performed by a wire saw.

17. The method of claim 14, furthering comprising abrading said substrate in a cutting region and providing a slurry to said cutting region.

18. The method of claim 14, wherein said substrate is formed into wafers or filaments.

* * * * *